United States Patent
Zhang et al.

(10) Patent No.: US 11,875,538 B2
(45) Date of Patent: Jan. 16, 2024

(54) POINT CLOUD ENCODING METHOD AND ENCODER

(71) Applicant: HUAWEI TECHNOLOGIES CO., LTD., Guangdong (CN)

(72) Inventors: Dejun Zhang, Shenzhen (CN); Tian Wang, Beijing (CN); Vladyslav Zakharchenko, Santa Clara, CA (US)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 457 days.

(21) Appl. No.: 17/205,100

(22) Filed: Mar. 18, 2021

(65) Prior Publication Data

US 2021/0201540 A1    Jul. 1, 2021

Related U.S. Application Data

(63) Continuation of application No. PCT/CN2019/103124, filed on Aug. 28, 2019.

(30) Foreign Application Priority Data

Sep. 19, 2018   (CN) .......................... 201811120300.8
Sep. 25, 2018   (CN) .......................... 201811121017.7

(51) Int. Cl.
  *G06T 9/00* (2006.01)
  *H04N 19/172* (2014.01)
(52) U.S. Cl.
  CPC ............ *G06T 9/00* (2013.01); *H04N 19/172* (2014.11)
(58) Field of Classification Search
  None
  See application file for complete search history.

(56) References Cited

U.S. PATENT DOCUMENTS

2011/0205338 A1   8/2011   Choi et al.
2017/0214943 A1   7/2017   Cohen et al.
(Continued)

FOREIGN PATENT DOCUMENTS

CN   103093191 A   5/2013
CN   104298998 A   1/2015
(Continued)

OTHER PUBLICATIONS

J. Jessup, S. N. Givigi and A. Beaulieu, "Robust and Efficient Multirobot 3-D Mapping Merging With Octree-Based Occupancy Grids,"in IEEE Systems Journal, vol. 11, No. 3, pp. 1723-1732, Sep. 2017, doi: 10.1109/JSYST.2015.2422615.*

(Continued)

*Primary Examiner* — Jiangeng Sun
(74) *Attorney, Agent, or Firm* — WOMBLE BOND DICKINSON (US) LLP

(57) ABSTRACT

A point cloud encoding method is provided to improve coding efficiency. The method includes: obtaining global matched patches in N frames of point clouds in a point cloud group; determining M union patch occupancy maps corresponding to M sets, where a union patch occupancy map corresponding to an $m^{th}$ set is a union set of occupancy maps of all global matched patches in the $m^{th}$ set; packing the M union patch occupancy maps to obtain a global occupancy map; packing each of the N frames of point clouds to obtain occupancy maps of the N frames of point clouds; and encoding the N frames of point clouds based on the occupancy maps of the N frames of point clouds.

20 Claims, 13 Drawing Sheets

(56) References Cited

U.S. PATENT DOCUMENTS

| | | | |
|---|---|---|---|
| 2017/0249401 A1* | 8/2017 | Eckart | G06V 10/7625 |
| 2017/0347120 A1 | 11/2017 | Chou et al. | |
| 2018/0173239 A1* | 6/2018 | Yoon | G05D 1/0214 |
| 2018/0188039 A1* | 7/2018 | Chen | G01C 21/3602 |
| 2018/0268570 A1* | 9/2018 | Budagavi | G06T 9/001 |

FOREIGN PATENT DOCUMENTS

| | | | | |
|---|---|---|---|---|
| CN | 107240129 A | | 10/2017 | |
| EP | 3737100 A1 | | 11/2020 | |
| WO | WO-2021115466 A1 | * | 6/2021 | G06T 9/00 |

OTHER PUBLICATIONS

Y. Yue, P. G. C. N. Senarathne, C. Yang, J. Zhang, M. Wen and D. Wang, "Hierarchical Probabilistic Fusion Framework for Matching and Merging of 3-D Occupancy Maps," in IEEE Sensors Journal, vol. 18, No. 21, pp. 8933-8949, 1 Nov. 1, 2018, doi: 10.1109/JSEN.2018.2867854.*

ITU-T H.223(Jul. 2001), Series H: Audiovisual and Multimedia Systems, Infrastructure of audiovisual services—Transmission, multiplexing and synchronization, Multiplexing protocol for low bit rate multimedia communication, total 74 pages.

ITU-T H.263(Jan. 2005), Series H: Audiovisual and Multimedia Systems, Infrastructure of audiovisual services—Coding of moving video, Video coding for low bit rate communication, total 226 pages.

ITU-T H.264(Apr. 2017), Series H: Audiovisual and Multimedia Systems, Infrastructure of audiovisual services—Coding of moving video, Advanced video coding for generic audiovisual services, total 812 pages.

ITU-T H.265(Feb. 2018), Series H: Audiovisual and Multimedia Systems, Infrastructure of audiovisual services—Coding of moving video. High efficiency video coding, total 692 pages.

Vladyslav Zakharchenko (Huawei), Algorithm description of mpeg-pcc-tmc2, International Organisation for Standardisation Organisation Internationale De Normalisation ISO/IEC JTC1/SC29/WGU Coding of Moving Pictures and Audio, ISO/IEC JTC1/SC29/WGU MPEG2018/N17526, Apr. 2018, San Diego, US, 14 pages.

Dejun zhang et al, TMC2 Improved Temporally Consistent Patch Packing(Temporally Consistent Multiframe Patch Packing—TCMPP), International Organisation for Standardisation Organisation Internationale De Normalisation ISO/IEC JTC1/SC29/WG11, Coding of Moving Pictures and Audio ISO/IEC JTC1/SC29/WG11 MPEG2018/m42718 ,Apr. 2018, San Diego, USA, 4 pages.

Zhang Dejun et al, [PCC] TMC2 CE2.6 Report on Temporally consistent Patch packing, International Organisation for Standardisation Organisation Internationale De Normalisation ISO/IEC JTC1/SC29/WG11, Coding of Moving Pictures and Audio, ISO/IEC JTC1/SC29/WG 11 MPEG2018/m42712April 2018, San Diego, US, 8 pages.

Dejun Zhang, A new patch side information encoding method for PCC TMC2, International Organisation for Standardisation Organisation ,Internationale De Normalisation ISO/IEC JTC1/SC29/WG11, Coding of Moving Pictures and Audio, ISO EC JTC1/SC29/WG11MPEG2018 M42195January 2018, Gwangju, Korea, 4 pages.

Zhang Dejun et al, [PCC] TMC2 A differential coding method for patch side information, International Organisation for Standardisation Organisation Internationale De Normalisation ISO/IEC JTC1/SC29/WG11, Coding of Moving Pictures and Audio, ISO/IEC JTC1/SC29/WGII MPEG2018/m42761, Apr. 2018, San Diego, US, 16 pages.

Dejun Zhang et al, [VPCC] New proposal of a global patch allocation method, International Organisation for Stand Ardisation Organisation Internationale De Normalisation, ISO/IECJTC1/SC29/WG11, Coding of Moving Pictures and Audio, ISO/IEC JTC1/SC29/WG11, MPEG2018/m44769October 2018, Macau, China, 4 pages.

* cited by examiner (a) (b) (c)

POINT CLOUD ENCODING METHOD AND ENCODER

CROSS-REFERENCE TO RELATED APPLICATIONS

This application is a continuation of International Application No. PCT/CN2019/103124, filed on Aug. 28, 2019, which claims priority to Chinese Patent Application No. 201811120300.8, filed on Sep. 19, 2018 and Chinese Patent Application No. 201811121017.7, filed on Sep. 25, 2018. The disclosures of the aforementioned applications are hereby incorporated by reference in their entireties.

TECHNICAL FIELD

This application relates to the field of encoding and decoding technologies, and in particular, to a point cloud (point cloud) encoding method and an encoder.

BACKGROUND

With continuous development of a three-dimensional (3D) sensor (for example, a 3D scanner) technology, it is increasingly convenient to collect point cloud data, and the point cloud data is collected on an increasingly large scale. Therefore, how to effectively encode the point cloud data becomes an urgent problem to be resolved.

SUMMARY

Embodiments of this application provide a point cloud encoding method and an encoder, to help improve coding or compression efficiency.

According to a first aspect, a point cloud encoding method is provided, and includes: obtaining global matched patches in N frames of point clouds in a point cloud group, where the point cloud group includes the N frames of point clouds, N≥2, and N is an integer; determining M union patch occupancy maps corresponding to M sets, where each of the M sets includes N global matched patches, the N global matched patches are patches that have a matching relationship and that are in the N frames of point clouds, a union patch occupancy map corresponding to an $m^{th}$ set in the M sets is a union set of occupancy maps of all global matched patches in the $m^{th}$ set, 1≤m≤M, and both m and M are integers; packing the M union patch occupancy maps to obtain a global occupancy map, where the global occupancy map is used to determine locations of the M union patch occupancy maps in the global occupancy map; packing each of the N frames of point clouds to obtain occupancy maps of the N frames of point clouds, where a location (that is, a first location) that is of an occupancy map of an $m^{th}$ global matched patch in an $n^{th}$ frame of point cloud and that is in an occupancy map of the $n^{th}$ frame of point cloud corresponds to a location (that is, a second position) that is of an $m^{th}$ union patch occupancy map in the M union patch occupancy maps and that is in the global occupancy map, 1≤n≤N, and n is an integer; and encoding the N frames of point clouds based on the occupancy maps of the N frames of point clouds.

A global matched patch in a frame of point cloud is a patch that is in the frame of point cloud and that has a matching relationship with a patch that can be found in each frame of point cloud other than the frame of point cloud in the point cloud group.

A patch having a matching relationship with another patch is a matched patch of a target patch, where the target patch is the another patch, or the target patch is a matched patch of the another patch.

It should be understood that patches having a matching relationship means that two patches have similar spatial locations and/or shapes in a 3D space. A method for determining whether two patches have a matching relationship is not limited in the specification. In an example, patches may be projected to a two-dimensional (2D) space based on a same projection plane. In the 2D space, an IoU (intersection over union) between the target patch and another patch having a possible or potential matching relationship with the target patch is calculated. A patch corresponding to an IoU that is the largest in all IoUs and that is greater than a specific threshold is a matched patch of the target patch. In another example, in the three-dimensional space, an IoU between the target patch and another patch having a possible or potential matching relationship with the target patch may be directly calculated. A patch corresponding to an IoU that is the largest in all IoUs and that is greater than a specific threshold is a matched patch of the target patch. Certainly, in this embodiment of this application, another method for searching for a patch having a matching relationship may be used. This is not limited herein.

Quantities of global matched patches in all frames of point clouds are the same. The quantity is M, and M is a positive integer.

N global matched patches included in one set are patches that have a matching relationship and that are in N frames of point clouds. It may be understood that each of the N global matched patches is from (or belongs to) one frame of point cloud, different global matched patches are from different point clouds, and the N global matched patches have a matching relationship. The N global matched patches are from N frames of point clouds, respectively.

That the first location corresponds to the second location may be understood as: Coordinate values of the first location are the same as coordinate values of the second location; or coordinate values of the first location in a coordinate system including the first location are substantially the same as coordinate values of the second location in a coordinate system including the second location; or coordinate values of the first location are different from coordinate values of the second location, but a location range including the second location includes a location range including the first location.

In an embodiment, statistics collection is performed on global matched patches in one point cloud group, and in a packing process, a same (or similar) location is allocated to global matched patches that have a matching relationship and that are in N frames of point clouds in the point cloud group. In this way, global matched patches that have a matching relationship and that are in generated occupancy maps of all frames of point clouds are spatially consistent. In other words, in this technical solution, spatial consistency between patches that have a matching relationship and that are in different point clouds are considered on a basis of temporal and spatial correlations between the different point clouds. An occupancy map of a point cloud can be used to guide generation of a depth map and a texture map of the point cloud, and a video-based/image-based coding technology is used for the depth map and the texture map of the point cloud. However, data about differences between frames is usually transmitted through a bitstream in the video-based/image-based coding technology. Therefore, patches that have a matching relationship and that are in different point clouds are spatially consistent. This helps improve coding or compression efficiency, and reduce bitstream transmission overheads.

In an embodiment, the packing each of the N frames of point clouds to obtain occupancy maps of the N frames of point clouds includes: determining, based on the location of the $m^{th}$ union patch occupancy map in the global occupancy map, the location that is of the occupancy map of the $m^{th}$ global matched patch in the $n^{th}$ frame of point cloud and that is in the occupancy map of the $n^{th}$ frame of point cloud; and packing occupancy maps of a global matched patch and a non-global matched patch in the $n^{th}$ frame of point cloud based on locations that are of occupancy maps of a portion of or all global matched patches in the $n^{th}$ frame of point cloud and that are in the occupancy map of the $n^{th}$ frame of point cloud, to obtain the occupancy map of the $n^{th}$ frame of point cloud, where the portion of or all the global matched patches include the $m^{th}$ global matched patch.

In an embodiment, the packing occupancy maps of a global matched patch and a non-global matched patch in the $n^{th}$ frame of point cloud based on locations that are of occupancy maps of a portion of or all global matched patches in the $n^{th}$ frame of point cloud and that are in the occupancy map of the $n^{th}$ frame of point cloud, to obtain the occupancy map of the $n^{th}$ frame of point cloud includes: mapping the occupancy maps of the portion of or all the global matched patches onto an initial occupancy map of the $n^{th}$ frame of point cloud based on the locations that are of the occupancy maps of the portion of or all the global matched patches and that are in the occupancy map of the $n^{th}$ frame of point cloud; and packing occupancy maps of other patches different from the portion of or all the global matched patches in the $n^{th}$ frame of point cloud based on the initial occupancy map that is of the $n^{th}$ frame of point cloud and onto which the occupancy maps of the portion of or all the patches are mapped, to obtain the occupancy map of the $n^{th}$ frame of point cloud. To be specific, mapping is first performed on the global matched patch, and then packing is performed on the non-global matched patch.

In an embodiment, the occupancy map of the non-global matched patch in the $n^{th}$ frame of point cloud occupies a preset location range. The preset location range is a location range that belongs to a union patch occupancy map corresponding to the occupancy map of the global matched patch in the $n^{th}$ frame of point cloud, but does not belong to the occupancy map of the global matched patch in the $n^{th}$ frame of point cloud. In this way, occupancy maps of all patches can be arranged more closely (or densely) in an occupancy map of a point cloud, and a size of the occupancy map of the point cloud is relatively small.

In an embodiment, the occupancy map of the non-global matched patch in the $n^{th}$ frame of point cloud does not occupy a preset location range. The preset location range is a location range that belongs to a union patch occupancy map corresponding to a set including the global matched patch in the $n^{th}$ frame of point cloud, but does not belong to the occupancy map of the global matched patch in the $n^{th}$ frame of point cloud. In this way, implementation is relatively simple.

In an embodiment, the packing each of the N frames of point clouds includes: when a difference between a maximum size of a pre-occupancy map of a first portion of point clouds in the N frames of point clouds and a size of the global occupancy map falls within a preset range, packing each of the N frames of point clouds by using the global occupancy map. In an embodiment, the pre-occupancy map of the first portion of point clouds is obtained by pre-packing an occupancy map of a patch in the first portion of point clouds according to a pre-packing algorithm, where the pre-packing algorithm is an algorithm used for packing without using the global occupancy map.

In an embodiment, the packing each of the N frames of point clouds includes: pre-packing an occupancy map of a patch in a first portion of point clouds in the N frames of point clouds according to a pre-packing algorithm, to obtain a pre-occupancy map of the first portion of point clouds, where the pre-packing algorithm is an algorithm used for packing without using the global occupancy map; and when a difference between a maximum size of the pre-occupancy map of the first portion of point clouds and a size of the global occupancy map falls within a preset range, packing each of the N frames of point clouds by using the global occupancy map. This helps obtain a bigger coding gain.

In an embodiment, the packing each of the N frames of point clouds includes: when a difference between a maximum size of a pre-occupancy map of a first portion of point clouds in the N frames of point clouds and a maximum size of a pre-occupancy map of a second portion of point clouds in the N frames of point clouds falls within a preset range, packing each of the N frames of point clouds by using the global occupancy map. In an embodiment, the pre-occupancy map of the first portion of point clouds is obtained by pre-packing an occupancy map of a patch in the first portion of point clouds in the N frames of point clouds according to a pre-packing algorithm, where the pre-packing algorithm is an algorithm used for packing without using the global occupancy map; and the pre-occupancy map of the second portion of point clouds is obtained by pre-packing an occupancy map of a patch in the second portion of point clouds in the N frames of point clouds by using the global occupancy map. This helps obtain a bigger coding gain.

In an embodiment, the packing each of the N frames of point clouds includes: pre-packing an occupancy map of a patch in a first portion of point clouds in the N frames of point clouds according to a pre-packing algorithm, to obtain a pre-occupancy map of the first portion of point clouds, where the pre-packing algorithm is an algorithm used for packing without using the global occupancy map; pre-packing an occupancy map of a patch in a second portion of point clouds in the N frames of point clouds by using the global occupancy map, to obtain a pre-occupancy map of the second portion of point clouds; and when a difference between a maximum size of the pre-occupancy map of the first portion of point clouds and a maximum size of the pre-occupancy map of the second portion of point clouds falls within a preset range, packing each of the N frames of point clouds by using the global occupancy map. This helps obtain a bigger coding gain.

In the foregoing technical solution related to the preset range, the preset range may be determined based on a coding gain, and may be an empirical value. Certainly, this is not limited in this embodiment of this application.

In an embodiment, the point cloud group is a group of frames (GOF). A quantity of frames of point clouds included in one GOF is configurable. For example, one GOF includes 32 frames of point clouds.

In an embodiment, the point cloud group is a sub-GOF, and the sub-GOF includes a plurality of point clouds that are temporally consecutive in one GOF. One GOF may be divided into at least two sub-GOFs. Quantities of frames of point clouds included in different sub-GOFs may be the same or different.

In an embodiment, the obtaining global matched patches in N frames of point clouds in a point cloud group includes:

obtaining a reference point cloud, where the reference point cloud is any frame of point cloud in the GOF; and for an $i^{th}$ patch in the reference point cloud, if a patch that matches a target patch exists in each non-reference point cloud in the GOF, determining that the $i^{th}$ patch and the patch that matches the target patch are global matched patches, where the target patch is the $i^{th}$ patch or the target patch is a matched patch of the $i^{th}$ patch, and the $i^{th}$ patch is any patch in the reference point cloud. It may be understood that a sequence of patches in the reference point cloud in the point cloud group determines a sequence of global matched patches in the point cloud group.

In an embodiment, when the point cloud group is the GOF, the reference point cloud is the first frame of point cloud in the GOF. This can ensure that a sequence of all global matched patches in one GOF is consistent with a sequence of global matched patches in the first frame of point cloud in the GOF, and can bring a particular gain in subsequent video coding.

In an embodiment, when the point cloud group is the sub-GOF, the reference point cloud is the first frame of point cloud in the sub-GOF or any frame of point cloud in a previous sub-GOF of the sub-GOF.

In an embodiment, the reference point cloud is the last frame of point cloud in the previous sub-GOF of the sub-GOF.

In an embodiment, the last frame of point cloud is a point cloud obtained after a packing operation is performed. This helps ensure that global matched patches in two neighboring sub-GOFs are temporally consecutive, and improve coding or compression efficiency.

According to a second aspect, an encoder is provided, and includes a packing module and an encoding module. The packing module is configured to perform the following operations: obtaining global matched patches in N frames of point clouds in a point cloud group, where the point cloud group includes the N frames of point clouds, N≥2, and N is an integer; determining M union patch occupancy maps corresponding to M sets, where each of the M sets includes N global matched patches, the N global matched patches are patches that have a matching relationship and that are in the N frames of point clouds, a union patch occupancy map corresponding to an $m^{th}$ set in the M sets is a union set of occupancy maps of all global matched patches in the $m^{th}$ set, 1≤m≤M, and both m and M are integers; packing the M union patch occupancy maps to obtain a global occupancy map, where the global occupancy map is used to determine locations of the M union patch occupancy maps in the global occupancy map; and packing each of the N frames of point clouds to obtain occupancy maps of the N frames of point clouds, where a location that is of an occupancy map of an $m^{th}$ global matched patch in an $n^{th}$ frame of point cloud and that is in an occupancy map of the $n^{th}$ frame of point cloud corresponds to a location that is of an $m^{th}$ union patch occupancy map in the M union patch occupancy maps and that is in the global occupancy map, 1≤n≤N, and n is an integer. The encoding module is configured to encode the N frames of point clouds based on the occupancy maps of the N frames of point clouds. The encoding module may be implemented by using some or all of modules 103 to 112 shown in FIG. 2.

For a specific implementation of the operations performed by the packing module or explanations of related content, refer to descriptions in the first aspect. Details are not described herein again.

According to a third aspect, a point cloud encoding method is provided, and includes: pre-packing an occupancy map of a patch in a first portion of point clouds in N frames of point clouds according to a pre-packing algorithm, to obtain a pre-occupancy map of the first portion of point clouds, where the pre-packing algorithm is an algorithm used for packing without using a global occupancy map; and when a difference between a maximum size of the pre-occupancy map of the first portion of point clouds and a size of the global occupancy map falls within a preset range, determining that a packing method is to pack each of the N frames of point clouds by using the global occupancy map; otherwise, determining that a packing method is the pre-packing algorithm; and encoding the N frames of point clouds based on occupancy maps, obtained through packing, of the N frames of point clouds. For descriptions of the global occupancy map, refer to the foregoing descriptions.

According to a fourth aspect, a point cloud encoding method is provided, and includes: pre-packing an occupancy map of a patch in a first portion of point clouds in N frames of point clouds according to a pre-packing algorithm, to obtain a pre-occupancy map of the first portion of point clouds, where the pre-packing algorithm is an algorithm used for packing without using a global occupancy map; pre-packing an occupancy map of a patch in a second portion of point clouds in the N frames of point clouds by using the global occupancy map, to obtain a pre-occupancy map of the second portion of point clouds; and when a difference between a maximum size of the pre-occupancy map of the first portion of point clouds and a maximum size of the pre-occupancy map of the second portion of point clouds falls within a preset range, determining that a packing method is to pack each of the N frames of point clouds by using the global occupancy map; otherwise, determining that a packing method is the pre-packing algorithm; and encoding the N frames of point clouds based on occupancy maps, obtained through packing, of the N frames of point clouds. For descriptions of the global occupancy map, refer to the foregoing descriptions.

According to a fifth aspect, an encoder is provided, and includes a packing module and an encoding module. The packing module is configured to: pre-pack an occupancy map of a patch in a first portion of point clouds in N frames of point clouds according to a pre-packing algorithm, to obtain a pre-occupancy map of the first portion of point clouds, where the pre-packing algorithm is an algorithm used for packing without using a global occupancy map; and when a difference between a maximum size of the pre-occupancy map of the first portion of point clouds and a size of the global occupancy map falls within a preset range, determine that a packing method is to pack each of the N frames of point clouds by using the global occupancy map; otherwise, determine that a packing method is the pre-packing algorithm. The encoding module is configured to encode the N frames of point clouds based on occupancy maps, obtained through packing, of the N frames of point clouds.

According to a sixth aspect, an encoder is provided, and includes a packing module and an encoding module. The packing module is configured to: pre-pack an occupancy map of a patch in a first portion of point clouds in N frames of point clouds according to a pre-packing algorithm, to obtain a pre-occupancy map of the first portion of point clouds, where the pre-packing algorithm is an algorithm used for packing without using a global occupancy map; pre-pack an occupancy map of a patch in a second portion of point clouds in the N frames of point clouds by using the global occupancy map, to obtain a pre-occupancy map of the second portion of point clouds; and when a difference between a maximum size of the pre-occupancy map of the first portion of point clouds and a maximum size of the pre-occupancy map of the second portion of point clouds falls within a preset range, determine that a packing method is to pack each of the N frames of point clouds by using the global occupancy map; otherwise, determine that a packing method is the pre-packing algorithm. The encoding module is configured to encode the N frames of point clouds based on occupancy maps, obtained through packing, of the N frames of point clouds.

According to a seventh aspect, a point cloud encoding method is provided, and includes: obtaining global matched patches in N frames of point clouds in a point cloud group; determining M union patch occupancy maps corresponding to M sets, where each of the M sets includes N global matched patches, the N global matched patches are patches that have a matching relationship and that are in the N frames of point clouds, a union patch occupancy map corresponding to an $m^{th}$ set in the M sets is a union set of occupancy maps of all global matched patches in the $m^{th}$ set, $1 \leq m \leq M$, and both m and M are integers; packing the M union patch occupancy maps to obtain a global occupancy map, where the global occupancy map is used to determine locations of the M union patch occupancy maps in the global occupancy map; packing occupancy maps of a global matched patch and a non-global matched patch in each of the N frames of point clouds by using the global occupancy map, to obtain occupancy maps of the N frames of point clouds; and encoding the N frames of point clouds based on the occupancy maps of the N frames of point clouds. In this technical solution, statistics collection is performed on global matched patches in one point cloud group, a global occupancy map is obtained based on the global matched patches, and occupancy maps of a global matched patch and a non-global matched patch in each frame of point cloud in the point cloud group are packed. This provides a condition for implementing "spatial consistency between patches that have a matching relationship and that are in different point clouds on a basis of temporal and spatial correlations between the different point clouds". Therefore, this helps improve coding or compression efficiency, and reduce bitstream transmission overheads.

According to an eighth aspect, an encoder is provided, and includes a packing module and an encoding module. The packing module is configured to perform the following operations: obtaining global matched patches in N frames of point clouds in a point cloud group; determining M union patch occupancy maps corresponding to M sets, where each of the M sets includes N global matched patches, the N global matched patches are patches that have a matching relationship and that are in the N frames of point clouds, a union patch occupancy map corresponding to an $m^{th}$ set in the M sets is a union set of occupancy maps of all global matched patches in the $m^{th}$ set, $1 \leq m \leq M$, and both m and M are integers; packing the M union patch occupancy maps to obtain a global occupancy map, where the global occupancy map is used to determine locations of the M union patch occupancy maps in the global occupancy map; and packing occupancy maps of a global matched patch and a non-global matched patch in each of the N frames of point clouds by using the global occupancy map, to obtain occupancy maps of the N frames of point clouds. The encoding module is configured to encode the N frames of point clouds based on the occupancy maps of the N frames of point clouds. The encoding module may be implemented by using some or all of modules 103 to 112 shown in FIG. 2.

Based on the seventh aspect or the eighth aspect, in an embodiment, a location that is of an occupancy map of an $m^{th}$ global matched patch in an $n^{th}$ frame of point cloud in the N frames of point clouds and that is in an occupancy map of the $n^{th}$ frame of point cloud corresponds to a location that is of an $m^{th}$ union patch occupancy map in the M union patch occupancy maps and that is in the global occupancy map, $1 \leq n \leq N$, and n is an integer. The technical solution can implement "spatial consistency between patches that have a matching relationship and that are in different point clouds on a basis of temporal and spatial correlations between the different point clouds", thereby helping improve coding or compression efficiency, and reduce bitstream transmission overheads.

For specific implementations of related terms or operations in the seventh aspect or the eighth aspect and a possible implementation of the seventh aspect or the eighth aspect, refer to the first aspect or the second aspect or the possible implementations of the first aspect or the second aspect. Details are not described herein again.

According to a ninth aspect, a point cloud data encoding device is provided. The device may include:
    a memory, configured to store point cloud data; and
    an encoder, configured to perform the point cloud encoding method according to any one of the first aspect, the third aspect, the fourth aspect, or the seventh aspect.

According to a tenth aspect, an encoding device is provided, and includes a nonvolatile memory and a processor that are coupled to each other. The processor invokes program code stored in the memory, to perform some or all operations in the method according to any one of the first aspect, the third aspect, the fourth aspect, or the seventh aspect.

According to an eleventh aspect, an encoding apparatus is provided. The apparatus includes a memory and a processor. The memory is configured to store program code. The processor is configured to invoke the program code, to perform the point cloud encoding method according to any one of the first aspect, the third aspect, the fourth aspect, or the seventh aspect.

According to a twelfth aspect, a computer-readable storage medium is provided. The computer-readable storage medium stores program code. When the program code is run on a computer, the computer is enabled to perform some or all operations in the method according to any one of the first aspect, the third aspect, the fourth aspect, or the seventh aspect.

According to a thirteenth aspect, a computer program product is provided. When the computer program product runs on a computer, the computer is enabled to perform some or all operations in the method according to any one of the first aspect, the third aspect, the fourth aspect, or the seventh aspect.

It should be understood that, for beneficial effects of the related apparatus/device/computer-readable storage medium/computer program product provided above, refer to the beneficial effects of the method embodiments provided in the corresponding aspects. Details are not described herein again.

DESCRIPTION OF EMBODIMENTS

The term "at least one (type)" in the embodiments of this application includes one (type) or more (types). "A plurality of" means two (types) or more than two (types). For example, at least one of A, B, and C includes the following cases: Only A exists, only B exists, only C exists, both A and B exist, both A and C exist, both B and C exist, and A, B, and C exist. The term "and/or" in the embodiments of this application describes only an association relationship for describing associated objects and represents that three relationships may exist. For example, A and/or B may represent the following three cases: Only A exists, both A and B exist, and only B exists. The term character "/" in the embodiments of this application usually represents an "or" relationship between associated objects. The character "/" in a formula represents a division operation. For example, A/B represents that A is divided by B. In the embodiments of this application, the terms "first", "second", and the like are intended to distinguish between different objects but do not indicate a particular order of the different objects.

Figure 1:
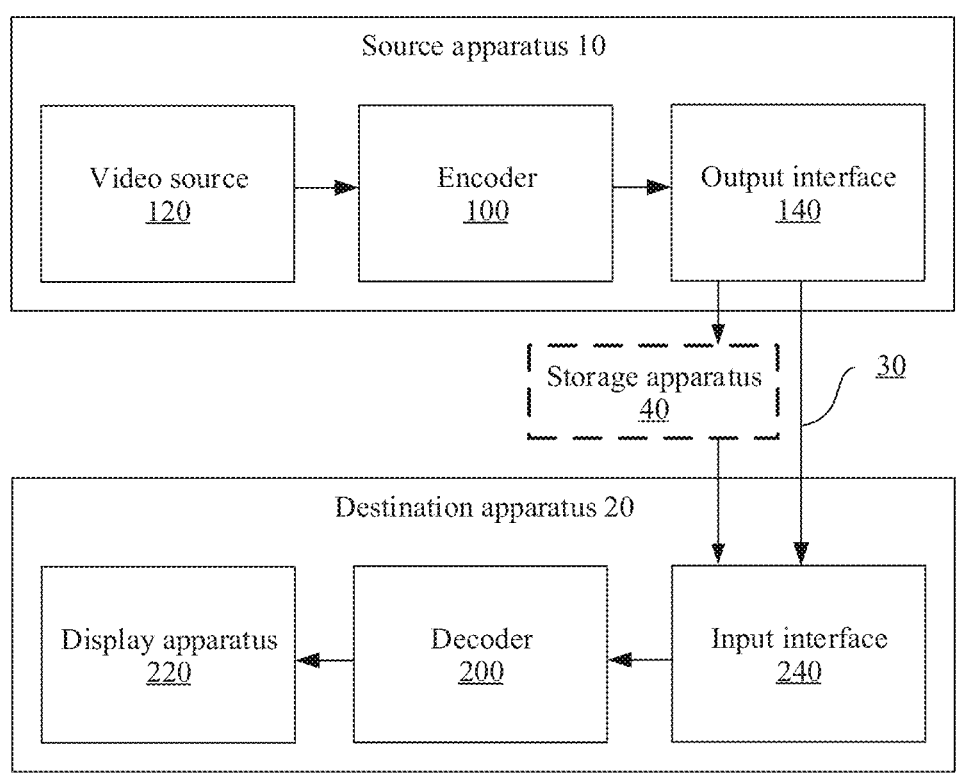
FIG. 1 is a block diagram of an example point cloud coding system that is applicable to an embodiment of this application.

FIG. 1 is a schematic block diagram of an example point cloud coding system 1 that is applicable to an embodiment of this application. The term "point cloud coding" or "coding" may usually be point cloud encoding or point cloud decoding. An encoder 100 in the point cloud coding system 1 may encode a to-be-encoded point cloud according to any point cloud encoding method provided in this application. A decoder 200 in the point cloud coding system 1 may decode a to-be-decoded point cloud according to a point cloud decoding method that corresponds to a point cloud encoding method used by the encoder.

As shown in FIG. 1, the point cloud coding system 1 includes a source apparatus 10 and a destination apparatus 20. The source apparatus 10 generates encoded point cloud data. Therefore, the source apparatus 10 may be referred to as a point cloud encoding apparatus. The destination apparatus 20 may decode the encoded point cloud data generated by the source apparatus 10. Therefore, the destination apparatus 20 may be referred to as a point cloud decoding apparatus. Various implementation solutions of the source apparatus 10, the destination apparatus 20, or both the source apparatus 10 and the destination apparatus 20 may include one or more processors and a memory coupled to the one or more processors. The memory may include but is not limited to a random access memory (RAM), a read-only memory (ROM), an electrically erasable programmable read-only memory (EEPROM), a flash memory, or any other medium that can be used to store desired program code in a form of an instruction or a data structure that can be accessed by a computer, as described in this specification.

The source apparatus 10 and the destination apparatus 20 may include various apparatuses, including a desktop computer, a mobile computing apparatus, a notebook (for example, laptop) computer, a tablet computer, a set top box, a handheld telephone set such as a "smart" phone, a television set, a camera, a display apparatus, a digital media player, a video game console, an in-vehicle computer, and a similar apparatus.

The destination apparatus 20 may receive the encoded point cloud data from the source apparatus 10 over a link 30. The link 30 may include one or more media or apparatuses that can transfer the encoded point cloud data from the source apparatus 10 to the destination apparatus 20. In an example, the link 30 may include one or more communications media that enable the source apparatus 10 to directly send the encoded point cloud data to the destination apparatus 20 in real time. In this example, the source apparatus 10 may modulate the encoded point cloud data according to a communication standard (for example, a wireless communication protocol), and may send modulated point cloud data to the destination apparatus 20. The one or more communications media may include a wireless and/or wired communications medium, for example, a radio frequency (RF) spectrum or one or more physical transmission lines. The one or more communications media may constitute a part of a packet-based network, and the packet-based network is, for example, a local area network, a wide area network, or a global network (for example, the internet). The one or more communications media may include a router, a switch, a base station, or another device facilitating communication from the source apparatus 10 to the destination apparatus 20.

In another example, the encoded point cloud data may be output to a storage apparatus 40 through an output interface 140. Similarly, the encoded point cloud data may be accessed from the storage apparatus 40 through an input interface 240. The storage apparatus 40 may include any one of a plurality of distributed data storage media or locally accessible data storage media, for example, a hard disk drive, a Blu-ray disc, a digital versatile disc (DVD), a compact disc read-only memory (CD-ROM), a flash memory, a volatile or nonvolatile memory, or any other appropriate digital storage medium configured to store the encoded point cloud data.

In another example, the storage apparatus 40 may correspond to a file server or another intermediate storage apparatus that can store the encoded point cloud data generated by the source apparatus 10. The destination apparatus 20 may access the stored point cloud data through streaming transmission or downloading from the storage apparatus 40. The file server may be any type of server that can store the encoded point cloud data and send the encoded point cloud data to the destination apparatus 20. An example of the file server include a network server (for example, used for a website), a file transfer protocol (FTP) server, a network attached storage (network attached storage, NAS) apparatus, or a local disk drive. The destination apparatus 20 may access the encoded point cloud data through any standard data connection (including an internet connection). The standard data connection may include a wireless channel (for example, a Wi-Fi connection), a wired connection (for example, a digital subscriber line (DSL) or a cable modem), or a combination thereof that is suitable for access to the encoded point cloud data stored on the file server. Transmission of the encoded point cloud data from the storage apparatus 40 may be streaming transmission, downloading transmission, or a combination thereof.

The point cloud coding system 1 described in FIG. 1 is merely an example, and technologies in this application are applicable to a point cloud coding (for example, point cloud encoding or point cloud decoding) apparatus that does not necessarily include any data communication between a point cloud encoding apparatus and a point cloud decoding apparatus. In another example, data is retrieved from a local memory, is transmitted on a network in a streaming manner, and the like. The point cloud encoding apparatus may encode the data and store the data to the memory, and/or the point cloud decoding apparatus may retrieve the data from the memory and decode the data. In many examples, apparatuses that do not communicate with each other and that only encode data and store the data to the memory and/or only retrieve data from the memory and decode the data perform encoding and decoding.

In the example in FIG. 1, the source apparatus 10 includes a data source 120, the encoder 100, and the output interface 140. In some examples, the output interface 140 may include a modulator/demodulator (a modem) and/or a transmitter. The data source 120 may include a point cloud capture apparatus (for example, a camera), a point cloud archive including previously captured point cloud data, a point cloud feed-in interface configured to receive point cloud data from a point cloud content provider, a computer graphics system configured to generate point cloud data, or a combination of these sources of point cloud data.

The encoder 100 may encode the point cloud data from the data source 120. In some examples, the source apparatus 10 directly sends the encoded point cloud data to the destination apparatus 20 through the output interface 140. In another example, the encoded point cloud data may alternatively be stored on the storage apparatus 40, so that the destination apparatus 20 subsequently accesses the encoded point cloud data for decoding and/or playing.

In the example in FIG. 1, the destination apparatus 20 includes the input interface 240, the decoder 200, and a display apparatus 220. In some examples, the input interface 240 includes a receiver and/or a modem. The input interface 240 may receive the encoded point cloud data over the link 30 and/or from the storage apparatus 40. The display apparatus 220 may be integrated with the destination apparatus 20 or may be located outside the destination apparatus 20. Generally, the display apparatus 220 displays decoded point cloud data. There may be a plurality of types of display apparatuses 220. For example, the display apparatus 220 may be, for example, a liquid crystal display (liquid crystal display, LCD), a plasma display, an organic light-emitting diode (organic light-emitting diode, OLED) display, or another type of display apparatus.

Although not shown in FIG. 1, in some embodiments, the encoder 100 and the decoder 200 may be integrated with an audio encoder and an audio decoder respectively, and may include an appropriate multiplexer-demultiplexer (MUX-DEMUX) unit or other hardware and software, to process encoding of both audio and a video in a same data stream or separate data streams. In some examples, if appropriate, the MUX-DEMUX unit may comply with the ITU H.223 multiplexer protocol or another protocol such as a user datagram protocol (user datagram protocol, UDP).

The encoder 100 and the decoder 200 each may be implemented as, for example, any one of a plurality of circuits: one or more microprocessors, digital signal processors (DSP), application-specific integrated circuits (ASIC), field-programmable gate arrays (FPGA), discrete logic, hardware, or any combination thereof. If this application is implemented partially through software, the apparatus may store, in an appropriate nonvolatile computer-readable storage medium, an instruction used for the software, and may use one or more processors to execute the instruction in hardware, to implement the technologies in this application. Any one of the foregoing content (including hardware, software, a combination of hardware and software, and the like) may be considered as one or more processors. The encoder 100 and the decoder 200 each may be included in one or more encoders or decoders, and the encoder or the decoder may be integrated as a part of a combined encoder/decoder (codec) in a corresponding apparatus.

In this application, the encoder 100 may be generally referred to as an apparatus that "signals" or "sends" some information to another apparatus such as the decoder 200. The term "signal" or "send" may generally refer to transmission of a syntax element and/or other data used for decoding compressed point cloud data. The transmission may occur in real time or almost in real time. Alternatively, the communication may occur after a period of time. For example, the communication may occur when a syntax element in an encoded bitstream is stored into a computer-readable storage medium during encoding, and the decoding apparatus may then retrieve the syntax element at any time after the syntax element is stored in the medium.

Figure 2:
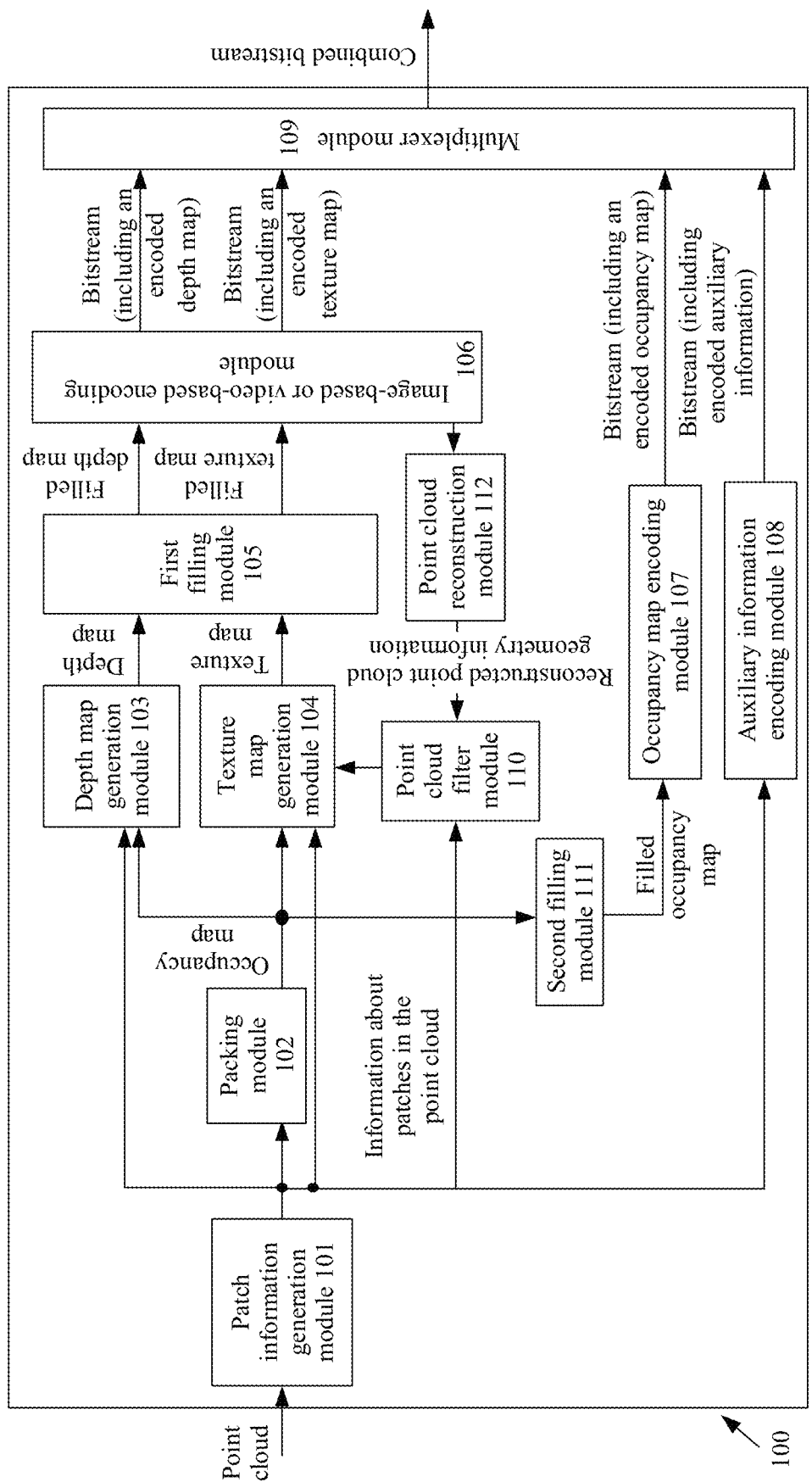
FIG. 2 is a schematic block diagram of an example encoder that is applicable to an embodiment of this application.

FIG. 2 is a schematic block diagram of an example encoder 100 that is applicable to an embodiment of this application. An MPEG (Moving Picture Expert Group) point cloud compression (PCC) encoding framework is used as an example for description in FIG. 2. In the example in FIG. 2, the encoder 100 may include a patch information generation module 101, a packing module 102, a depth map generation module 103, a texture map generation module 104, a first filling module 105, an image-based or video-based encoding module 106, an occupancy map encoding module 107, an auxiliary information encoding module 108, a multiplexer module 109, and the like. In addition, the encoder 100 may further include a point cloud filter module 110, a second filling module 111, a point cloud reconstruction module 112, and the like.

The patch information generation module 101 is configured to partition a frame of point cloud into a plurality of patches by using a method, and obtain related information and the like of the generated patches. The patch is a set of some points in a frame of point cloud, and generally one connected component region corresponds to one patch. The related information of the patches may include but is not limited to at least one of the following information: a quantity of the patches obtained by partitioning the point cloud, location information of each patch in a three-dimensional space, an index of a normal coordinate axis of each patch, a depth map generated when each patch is projected from the three-dimensional space to a two-dimensional space, a size of the depth map of each patch (for example, the width and the height of the depth map), an occupancy map generated when each patch is projected from the three-dimensional space to the two-dimensional space, and the like. Some of the related information, such as the quantity of patches obtained by partitioning the point cloud, the index of the normal coordinate axis of each patch, the size of the depth map of each patch, the location information of each patch in the point cloud, and size information of the occupancy map of each patch, may be used as auxiliary information and sent to the auxiliary information encoding module 108 for encoding (that is, compression encoding). The occupancy map of each patch may be sent to the packing module 102 for packing. Specifically, patches in the point cloud are sorted in a specific order, for example, sorted in descending (ascending) order of the widths/heights of the occupancy maps of the patches; and then the occupancy maps of the patches are successively inserted into an available region of an occupancy map of the point cloud in the order of the sorted patches, to obtain the occupancy map of the point cloud. In addition, information about a specific location of each patch in the occupancy map of the point cloud, the depth map of each patch, and the like may be sent to the depth map generation module 103.

After the packing module 102 obtains the occupancy map of the point cloud, the second filling module 111 may fill the occupancy map of the point cloud and then send a filled occupancy map of the point cloud to the occupancy map encoding module 107 for encoding. In addition, the occupancy map of the point cloud may be used to guide the depth map generation module 103 to generate a depth map of the point cloud and guide the texture map generation module 104 to generate a texture map of the point cloud.

Figure 3:
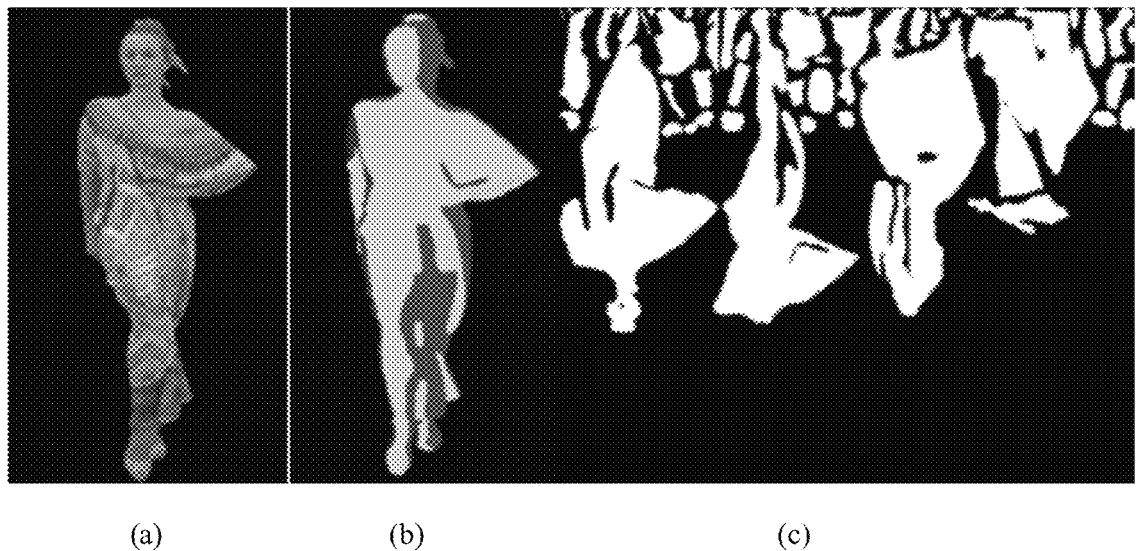
FIG. 3 is a schematic diagram showing a point cloud, a patch in the point cloud, and an occupancy map of the point cloud that are applicable to an embodiment of this application.

FIG. 3 is a schematic diagram showing a point cloud, patches in the point cloud, and an occupancy map of the point cloud that are applicable to an embodiment of this application. To be specific, (a) in FIG. 3 shows a frame of point cloud; (b) in FIG. 3 shows an obtained patch in the point cloud based on (a) in FIG. 3; and (c) in FIG. 3 shows an occupancy map of the point cloud, where the occupancy map of the point cloud is obtained by packing occupancy maps that are of all patches shown in (b) in FIG. 3 and that are obtained by mapping all the patches onto a two-dimensional plane.

The depth map generation module 103 is configured to: generate the depth map of the point cloud based on the occupancy map of the point cloud, and the occupancy map and depth information of each patch in the point cloud, and send the generated depth map to the first filling module 105, so that the first filling module 105 fills empty pixels in the depth map, to obtain a filled depth map.

The texture map generation module 104 is configured to: generate the texture map of the point cloud based on the occupancy map of the point cloud, and the occupancy map and texture information of each patch in the point cloud, and send the generated texture map to the first filling module 105, so that the first filling module 105 fills empty pixels in the received texture map, to obtain a filled texture map.

The first filling module 105 sends the filled depth map and the filled texture map to the image-based or video-based encoding module 106 for image-based or video-based encoding. Subsequent processing are as follows:

On the one hand, the image-based or video-based encoding module 106, the occupancy map encoding module 107, and the auxiliary information encoding module 108 send obtained encoding results (namely, bitstreams) to the multiplexer module 109, and the multiplexer module 109 combines the encoding results into one bitstream, where the bitstream may be sent to an output interface 140.

On the other hand, the image-based or video-based encoding module 106 sends an obtained encoding result (namely, a bitstream) to the point cloud reconstruction module 112 for point cloud reconstruction, to obtain a reconstructed point cloud (namely, obtain reconstructed geometry information of the point cloud). Specifically, video decoding is performed on an encoded depth map obtained by the image-based or video-based encoding module 106, to obtain a decoded depth map of the point cloud, and the reconstructed geometry information of the point cloud is obtained by using the decoded depth map, the occupancy map of the point cloud, and the auxiliary information of each patch. The geometry information of the point cloud is coordinate values of a point in the point cloud (for example, each point in the point cloud) in the three-dimensional space.

In an embodiment, the point cloud reconstruction module 112 may further send texture information of the point cloud and the reconstructed geometry information of the point cloud to a coloring module. The coloring module is configured to color a reconstructed point cloud to obtain texture information of the reconstructed point cloud.

In an embodiment, the texture map generation module 104 may further generate the texture map of the point cloud based on information that is obtained by the point cloud filter module 110 by filtering the reconstructed geometry information of the point cloud.

Figure 4:
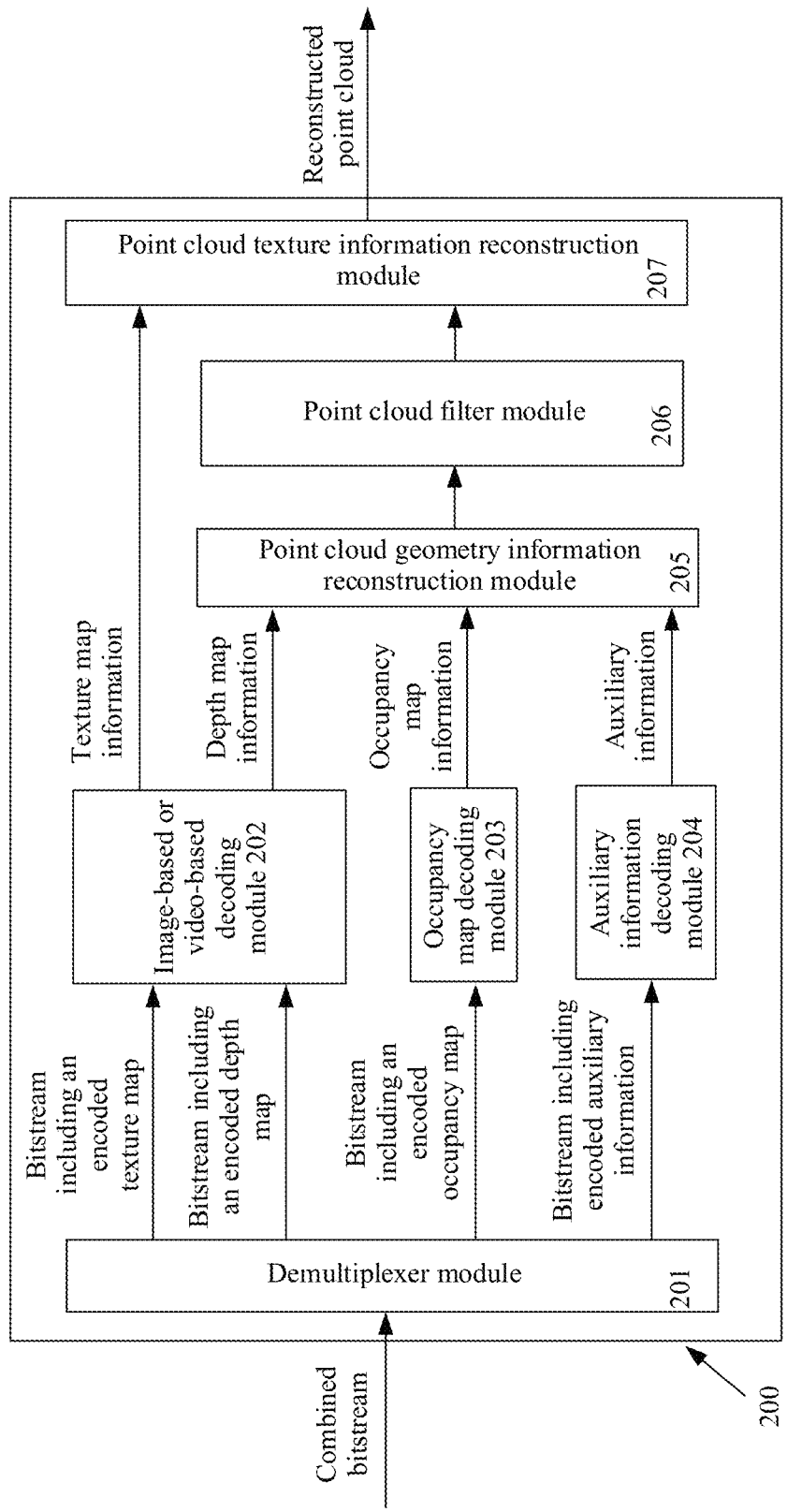
FIG. 4 is a schematic block diagram of an example decoder that is applicable to an embodiment of this application.

FIG. 4 is a schematic block diagram of an example decoder 200 that is applicable to an embodiment of this application. An MPEG PCC decoding framework is used as an example for description in FIG. 4. In the example in FIG. 4, the decoder 200 may include a demultiplexer module 201, an image-based or video-based decoding module 202, an occupancy map decoding module 203, an auxiliary information decoding module 204, a point cloud geometry information reconstruction module 205, a point cloud filter module 206, and a point cloud texture information reconstruction module 207.

The demultiplexer module 201 is configured to send an input bitstream (that is, a combined bitstream) to a corresponding decoding module. Specifically, a bitstream including an encoded texture map and a bitstream including an encoded depth map are sent to the image-based or video-based decoding module 202; a bitstream including an encoded occupancy map is sent to the occupancy map decoding module 203; and a bitstream including encoded auxiliary information is sent to the auxiliary information decoding module 204.

The image-based or video-based decoding module 202 is configured to: decode the received encoded texture map and encoded depth map; and then send decoded texture map information to the point cloud texture information reconstruction module 207, and send decoded depth map information to the point cloud geometry information reconstruction module 205. The occupancy map decoding module 203 is configured to decode the received bitstream including the encoded occupancy map, and send decoded occupancy map information to the point cloud geometry information reconstruction module 205. The auxiliary information decoding module 204 is configured to decode the received encoded auxiliary information, and send, to the point cloud geometry information reconstruction module 205, decoded information indicating the auxiliary information.

The point cloud geometry information reconstruction module 205 is configured to reconstruct geometry information of a point cloud based on the received occupancy map information and the received auxiliary information. After being filtered by the point cloud filter module 206, reconstructed geometry information of the point cloud is sent to the point cloud texture information reconstruction module 207.

The point cloud texture information reconstruction module 207 is configured to reconstruct texture information of the point cloud, to obtain a reconstructed point cloud.

It may be understood that the decoder 200 shown in FIG. 4 is merely used as an example. In a specific implementation, the decoder 200 may include more or fewer modules than those shown in FIG. 4. This is not limited in this embodiment of this application.

For ease of understanding of the technical solutions provided in the embodiments of this application, the following describes technologies and terms used in the embodiments of this application.

In an MPEG point cloud encoding method, an encoder first partitions a to-be-encoded point cloud (that is, a current frame or a current frame of point cloud) into several patches according to a specific rule. These patches do not have an overlapping region. Then, each patch is projected from a 3D space to a 2D plane, to obtain a two-dimensional image (that is, an occupancy map of the patch). Next, occupancy maps of all patches (or occupancy maps that are of patches and that are obtained after resolution is reduced) are closely arranged on one two-dimensional image according to a specific rule, to obtain an occupancy map of the current frame. This method for arranging an occupancy map of a patch is referred to as packing. Subsequently, a depth map of the current frame and a texture map of the current frame are generated according to a packing sequence. To be specific, the depth map of the current frame is a two-dimensional image that is generated by packing, according to the packing sequence, depth maps obtained by projecting all the patches; and the texture map of the current frame is a two-dimensional image that is generated by packing, according to the packing sequence, depth maps obtained projecting all the patches. The occupancy map of the current frame is a two-dimensional binary image, and used to indicate whether a location of each pixel of the two-dimensional image is occupied by a point in the point cloud. Generally, to reduce a quantity of coded bits, resolution of the occupancy map of the current frame is lower than resolution of the depth map of the current frame and resolution of the texture map of the current frame.

The following provides example information and description information of a patch (or referred to as side information of the patch). Details are shown in Table 1.

TABLE 1

| Information about a patch | Description |
| --- | --- |
| u0 | Coordinate location x of the patch (or an occupancy map of the patch) in the occupancy map of the current frame |
| v0 | Coordinate location y of the patch (or an occupancy map of the patch) in the occupancy map of the current frame |

TABLE 1-continued

| Information about a patch | Description |
| --- | --- |
| sizeU0 | Width of the patch (or an occupancy map of the patch) in the occupancy map of the current frame |
| sizeV0 | Height of the patch (or an occupancy map of the patch) in the occupancy map of the current frame |
| occupancyResolution | Resolution of the occupancy map of the current frame, for example, 16 |
| sizeU | Width of an occupancy map of the patch |
| sizeV | Height of an occupancy map of the patch |
| Occupancy | Occupancy map of the patch |

Coordinates of the patch (or the occupancy map of the patch) in the occupancy map of the current frame may be represented as (x, y), where x represents a minimum coordinate value of each point of the occupancy map of the patch on an X axis, and y represents a minimum coordinate value of each point of the occupancy map of the patch on a Y axis. Certainly, this is not limited in the embodiments of this application. A coordinate system of the occupancy map of the current frame is an X-Y coordinate system, the X-axis represents a coordinate axis in a horizontal direction, and the Y-axis is a coordinate axis in a vertical direction.

Figure 5:
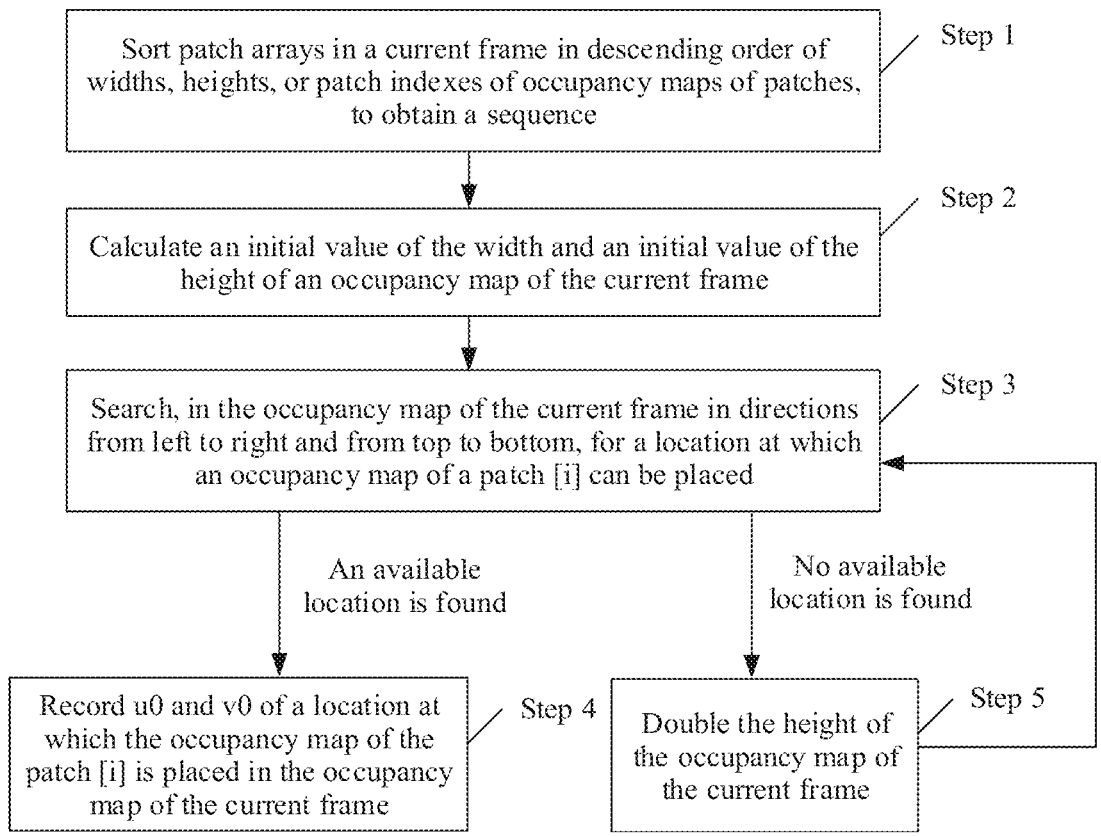
FIG. 5 is a schematic flowchart of a packing method provided in an MPEG point cloud coding technology.

FIG. 5 is a schematic flowchart of a packing method in an MPEG point cloud coding technology. The method shown in FIG. 5 may be performed by a packing module in an encoder. In the method shown in FIG. 5, it is assumed that the encoder partitions a current frame into patchCount patches, and these patches are usually stored in a patch array form. The method shown in FIG. 5 includes the following operations.

Operation 1: Sort the patch arrays in the current frame in descending order of widths (sizeU), heights (sizeV), or patch indexes (patchIndex) of occupancy maps of the patches, to obtain a sequence. In the following, an patch array in the sequence is denoted as a patch [i], where i=0, 1, . . . , and patchCount−1.

Operation 2: Calculate an initial value of the width and an initial value of the height of an occupancy map of the current frame.

For example, the initial value of the width of the occupancy map of the current frame is obtained according to max{minimumImageWidth/occupancyResolution, patch[0].sizeU0}, where minimumImageWidth represents a minimum value of the width of the occupancy map of the current frame, and patch[0].sizeU0 represents the width of an occupancy map of a patch[0].

The initial value of the height of the occupancy map of the current frame is obtained according to a formula max{minimumImageHeight/occupancyResolution, patch[0].sizeV0}, where minimumImageHeight represents a minimum value of the height of the occupancy map of the current frame, and patch[0].sizeV0 represents the height of an occupancy map of a patch[0].

Operation 3: Search, in the occupancy map of the current frame in directions from left to right and from top to bottom, for a location at which an occupancy map of the patch [i] can be placed. In the occupancy map of the current frame, an occupancy map of a new patch cannot be placed at a location at which an occupancy map of a patch is already placed. It may be understood that, the occupancy map of the patch [i] in operation 3 may be replaced with an occupancy map that is of the patch [i] and that is obtained after resolution is reduced.

If an available location is found for the occupancy map of the patch [i], operation 4 is performed.

If no available location is found for the occupancy map of the patch [i] in the occupancy map of the current frame, operation 5 is performed.

Operation 4: Record u0 and v0 of a location at which the occupancy map of the patch [i] is placed in the occupancy map of the current frame.

After operation 4 is performed, the process ends.

Operation 5: Double the height occupancySizeV of the occupancy map of the current frame, and continue to perform operation 3 based on an updated (that is, doubled) current frame.

It may be understood that operation 3 is performed by traversing all patch arrays in the current frame, to obtain a final occupancy map of the current frame.

It may be understood that a packing process may be considered as a process of updating the occupancy map of the current frame. Unless otherwise specified, the occupancy map of the current frame described in the following refers to the final occupancy map of the current frame. After a packing operation is performed, location information, in the occupancy map of the current frame, of occupancy maps of all the patches in the current frame can be determined. Subsequently, video-based/image-based encoding is performed on a depth map of the current frame and a texture map of the current frame based on the location information.

In the packing method shown in FIG. 5, occupancy maps of all patches are directly packed after the patches are sorted in descending order. Therefore, it is easy to implement. However, an occupancy map of one patch may have different locations in an occupancy map of a current frame and an occupancy map of a previous frame. This greatly degrades encoding performance of a video-based/image-based encoding module, and more bits are required for encoding side information of a patch.

In view of this, the embodiments of this application provide a point cloud encoding method and an encoder. In an embodiment, a point cloud in the embodiments of this application is a dynamic point cloud, and there are temporal and spatial correlations between a current frame of point cloud and a previous frame of point cloud. The correlation may mean that there is a global matched patch in a point cloud group.

The following describes a point cloud encoding method and an encoder that are provided in the embodiments of this application with reference to the accompanying drawings.

Figure 6:
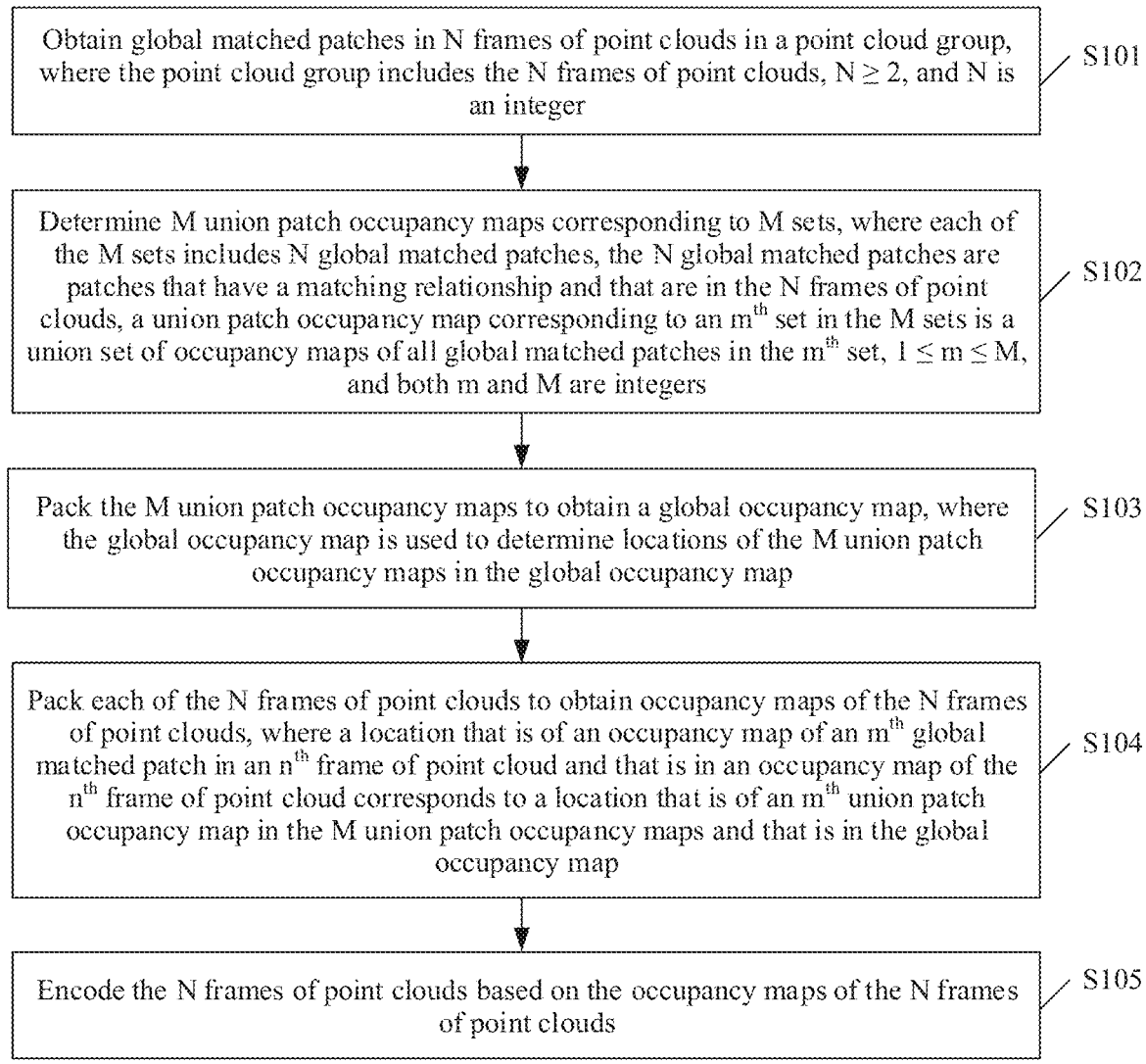
FIG. 6 is a schematic flowchart of a point cloud encoding method according to an embodiment of this application.

FIG. 6 is a schematic flowchart of a point cloud encoding method according to an embodiment of this application. With reference to the point cloud coding system shown in FIG. 1, the method shown in FIG. 6 may be performed by the encoder 100 in FIG. 1. The method shown in FIG. 6 includes the following operations.

S101: Obtain global matched patches in N frames of point clouds in a point cloud group, where the point cloud group includes the N frames of point clouds, N≥2, and N is an integer. In an embodiment, the N frames of point clouds are N frames of point clouds that are temporally consecutive. Certainly, this is not limited in this embodiment of this application.

A global matched patch in a frame of point cloud is a patch that is in the frame of point cloud and that has a matching relationship with a patch that can be found in each frame of point cloud other than the frame of point cloud in the point cloud group. In addition, a patch having a matching relationship with the patch is a global matched patch. For example, it is assumed that the point cloud group includes four frames of point clouds (which are denoted as point clouds 1 to 4). For any patch in the point cloud 1, if a patch having a matching relationship with the patch can be found in each of the point cloud 2 to the point cloud 4, for example, if patches having a matching relationship with a patch 11 in the point cloud 1 are a patch 21 in the point cloud 2, a patch 31 in the point cloud 3, and a patch 41 in the point cloud 4, the patches 11, 21, 31, and 41 are all global matched patches. A patch w1 is a global matched patch in a point cloud w, where 1≤w≤4, and w is an integer.

A patch having a matching relationship with another patch is a matched patch of a target patch, where the target patch is the another patch or a matched patch of the another patch. In an embodiment, a matched patch, in another frame of point cloud, of a patch in a frame of point cloud may be a patch that is in the another frame of point cloud and whose intersection over union (IoU) with the patch is the largest and greater than or equal to a preset threshold. For a manner of determining a matched patch of a current patch, refer to other patent documents, for example, a Chinese patent application with an application No. 201810045808.X. Details are not described herein.

It can be learned from the foregoing description that quantities of global matched patches in all frames of point clouds are the same, and the quantity (denoted as M below) may be a positive integer greater than or equal to 1. If the point cloud group includes the N frames of point clouds, for any global matched patch, a quantity of patches having a matching relationship with the global matched patch is N−1.

In an embodiment, the N−1 patches are all matched patches of the patch.

In another embodiment, at least one of the N−1 patches is a matched patch of the patch, and other patches have a chain matching relationship with the patch. For a specific example of the chain matching relationship, refer to a description below.

S102: Determine M union patch occupancy maps corresponding to M sets. Each of the M sets includes N global matched patches, the N global matched patches are patches that have a matching relationship and that are in the N frames of point clouds, a union patch occupancy map corresponding to an $m^{th}$ set in the M sets is a union set of occupancy maps of all global matched patches in the $m^{th}$ set, 1≤m≤M, and both m and M are integers.

That N global matched patches included in one set are patches that have a matching relationship and that are in the N frames of point clouds may be understood as: The N global matched patches are from the N frames of point clouds respectively, and the N global matched patches have a matching relationship. That the N global matched patches are from the N frames of point clouds respectively may be understood as: Each of the N global matched patches is from (or belongs to) one frame of point cloud, and different global matched patches are from different point clouds. For example, an $n^{th}$ global matched patch in the N global matched patches is from an $n^{th}$ frame of point cloud in the N frames of point clouds.

It may be understood that N global matched patches included in one set are patches that have a matching relationship and that are in the N frames of point clouds. This feature not only describes features of the N global matched patches included in the set, but also describes a concept of the global matched patch. To be specific, a global matched patch in a frame of point cloud is a patch that has a matching relationship with a patch that can be found in each frame of point cloud other than the frame of point cloud in the point cloud group.

In an embodiment, that the N global matched patches have a matching relationship may include: Any two of the N global matched patches match with each other. In other words, the N global matched patches match with each other.

In another embodiment, that the N global matched patches have a matching relationship may include: The N global matched patches have a chain matching relationship. For example, a first global matched patch in the N global matched patches matches a second global matched patch, the second global matched patch matches a third global matched patch, the third global matched patch matches a fourth global matched patch, . . . , and an (N−1)th global matched patch matches an $N^{th}$ global matched patch.

Certainly, this is not limited in this embodiment of this application. For example, that the N global matched patches have a matching relationship may include: Any two patches in some of the N global matched patches match with each other, and other global matched patches have a chain matching relationship.

It can be learned from the foregoing descriptions that each frame of point cloud includes M global matched patches. In an example, an $m^{th}$ global matched patch in the M global matched patches belongs to the $m^{th}$ set in the M sets.

Figure 7:
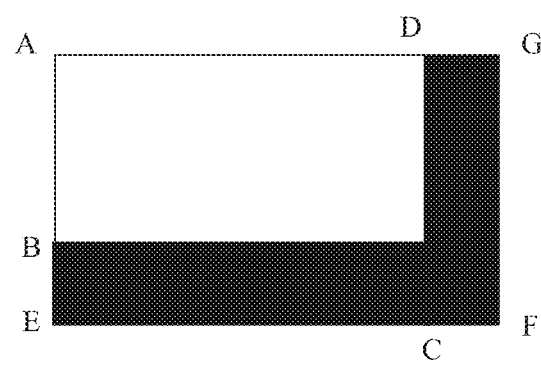
FIG. 7 is a schematic diagram of a union set of occupancy maps of two patches applicable to an embodiment of this application.

In an embodiment, a union set of occupancy maps of at least two global matched patches may be obtained by using a method for obtaining a union set of two-dimensional maps in the conventional technology, and a union patch occupancy map corresponding to each set is obtained. FIG. 7 is a schematic diagram of a union set of occupancy maps of two patches applicable to an embodiment of this application. A rectangle ABCD represents an occupancy map of a global matched patch 1 in a point cloud 1, and a rectangle AEFG represents an occupancy map of a global matched patch 2 in a point cloud 2. A union set, that is, a union patch occupancy map, of the occupancy maps of the two global matched patches is the rectangle AEFG shown in FIG. 7.

A region (or a range or a region range) occupied by an occupancy map of a global matched patch is less than or equal to a region occupied by a union patch occupancy map corresponding to the global matched patch (that is, a union patch occupancy map corresponding to a set including the global matched patch). In other words, a union patch occupancy map corresponding to a set including a global matched patch includes an occupancy map of the global matched patch. For example, a region occupied by the occupancy map of the patch 1 in FIG. 7 is less than a region occupied by the union patch occupancy map, and a region occupied by the occupancy map of the global matched patch 2 in FIG. 7 is equal to the region occupied by the union patch occupancy map.

S103: Pack the M union patch occupancy maps to obtain a global occupancy map, where the global occupancy map is used to determine locations of the M union patch occupancy maps in the global occupancy map (or locations, in the global occupancy map, of the M union patch occupancy maps that are obtained after resolution is reduced).

A specific implementation of S103 is not limited in this embodiment of this application. For example, the M union patch occupancy maps may be packed by using the packing method shown in FIG. 5. The locations of the M union patch occupancy maps in the global occupancy map may be represented by values of u0 and v0 shown in Table 1.

S104: Pack each of the N frames of point clouds to obtain occupancy maps of the N frames of point clouds. A location (that is, a first location) that is of an occupancy map of an $m^{th}$ global matched patch in an $n^{th}$ frame of point cloud and that is in an occupancy map of the $n^{th}$ frame of point cloud corresponds to a location (that is, a second location) that is of an $m^{th}$ union patch occupancy map in the M union patch occupancy maps and that is in the global occupancy map.

That the first location corresponds to the second location may be understood as: Coordinate values of the first location are the same as coordinate values of the second location; or coordinate values of the first location in a coordinate system including the first location are substantially the same as coordinate values of the second location in a coordinate system including the second location; or coordinate values of the first location are different from coordinate values of the second location, but a location range including the second location includes a location range including the first location. The coordinate values of the first location may be represented by values of the location u0 and v0 that is of the occupancy map of the $m^{th}$ global matched patch in the occupancy map of the $n^{th}$ frame of point cloud and that is in the occupancy map of the $n^{th}$ frame of point cloud. The coordinate values of the second position may be represented by values of the location u0 and v0 of the $m^{th}$ union patch occupancy map in the global occupancy map. The location range including the first location is a region occupied by the occupancy map of the $m^{th}$ global matched patch, and the location range including the second location is a region occupied by the $m^{th}$ union patch occupancy map.

Figure 8:
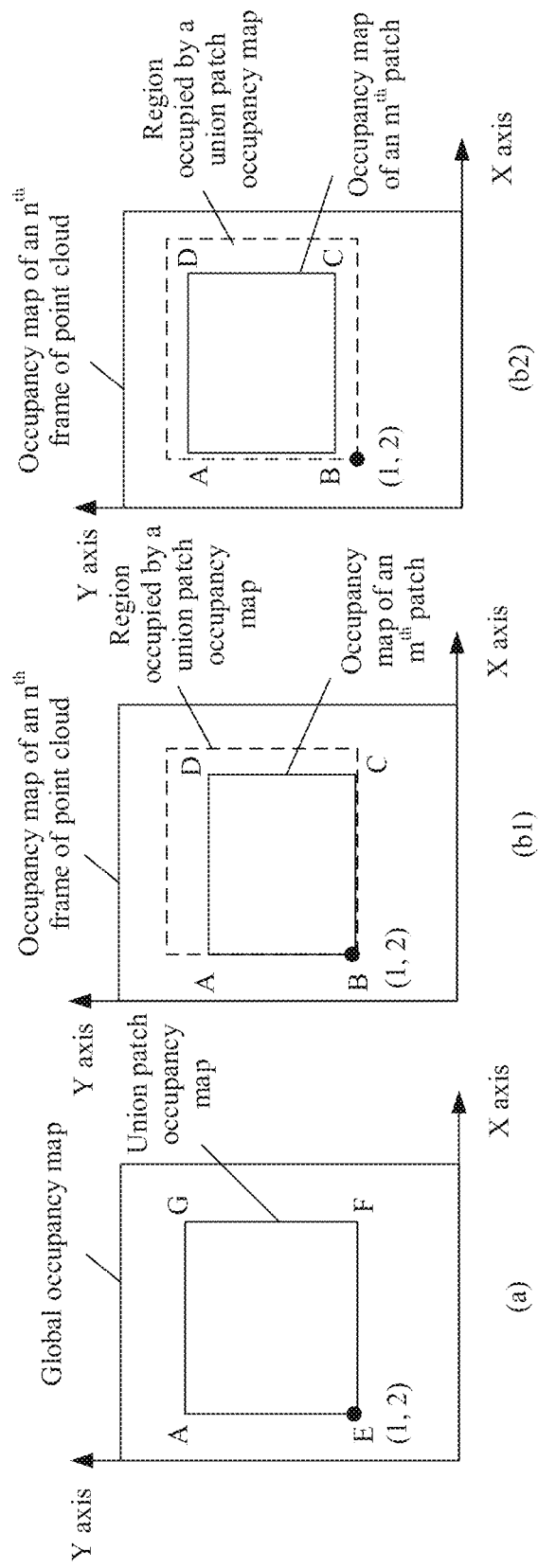
FIG. 8 is a schematic diagram of a correspondence between a first location and a second location according to an embodiment of this application.

For example, FIG. 8 is a schematic diagram of a correspondence between a first location and a second location according to an embodiment of this application, and FIG. 8 is based on FIG. 7. To be specific, (a) in FIG. 8 shows the location (that is, the second location) of the $m^{th}$ union patch occupancy map AEFG in the global occupancy map, where coordinates of the location are coordinates (1, 2) of a point E, that is, u0=1 and v0=2; and (b1) in FIGS. 8 and (b2) in FIG. 8 each show the location (that is, the first location) that is of the occupancy map (that is, an occupancy map shown by a rectangle ABCD) of the $m^{th}$ global matched patch in the $n^{th}$ frame of point cloud and that is in the occupancy map of the $n^{th}$ frame of point cloud. In (b1) in FIG. 8, coordinate values of the first location are the same as coordinate values of the second location. In (b2) in FIG. 8, coordinate values of the first location are different from coordinate values of the second location, but a location range including the second location includes a location range including the first location.

In an embodiment, an occupancy map of a non-global matched patch in the $n^{th}$ frame of point cloud occupies a preset location range, where the preset location range is a region that belongs to a union patch occupancy map corresponding to a set including a global matched patch in the $n^{th}$ frame of point cloud, but does not belong to an occupancy map of the global matched patch in the $n^{th}$ frame of point cloud. In this way, occupancy maps of all patches can be arranged more closely (or densely) in an occupancy map of a point cloud, and a size of the occupancy map of the point cloud is relatively small.

The "preset location range" in the optional implementation is used for one point cloud. In other words, the preset location range includes a preset location range for each global matched patch in some or all global matched patches in the point cloud. For example, with reference to FIG. 7, when an occupancy map of a patch in the point cloud 1 is packed, for a patch 1 (for example, the patch represented by the rectangle ABCD), a preset location range refers to a region shown as a black shaded part in FIG. 7. In other words, an occupancy map of a non-global matched patch may be mapped onto (or placed in) the region shown as the black shaded part in FIG. 7.

Alternatively, the occupancy map of the non-global matched patch in the $n^{th}$ frame of point cloud does not occupy the preset location range. For example, the occupancy map of the non-global matched patch cannot be mapped onto (or placed in) the region shown as the black shaded part in FIG. 7.

S105: Encode the N frames of point clouds based on the occupancy maps of the N frames of point clouds.

Specifically, generation of a depth map and a texture map of the point cloud is guided based on each of the occupancy maps of the N frames of point clouds, and video-based/image-based encoding or the like is performed on the depth map and the texture map of the point cloud. For details, refer to the foregoing descriptions of a principle of the encoder 100.

In this technical solution, statistics collection is performed on global matched patches (for example, all global matched patches) in one point cloud group, and in a packing process, a same (or similar) location is allocated to global matched patches that have a matching relationship and that are in all frames of point clouds in the point cloud group. In this way, global matched patches that have a matching relationship and that are in generated occupancy maps of all frames of point clouds are spatially consistent. In other words, in this technical solution, spatial consistency between patches that have a matching relationship and that are in different point clouds are considered on a basis of temporal and spatial correlations between the different point clouds. An occupancy map of a point cloud can be used to guide generation of a depth map and a texture map of the point cloud, and a video-based/image-based coding technology is used for the depth map and the texture map of the point cloud. However, data about differences between frames is usually transmitted through a bitstream in the video-based/image-based coding technology. Therefore, patches that have a matching relationship and that are in different point clouds are spatially consistent. This helps improve coding or compression efficiency, and reduce bitstream transmission overheads.

Figure 9:
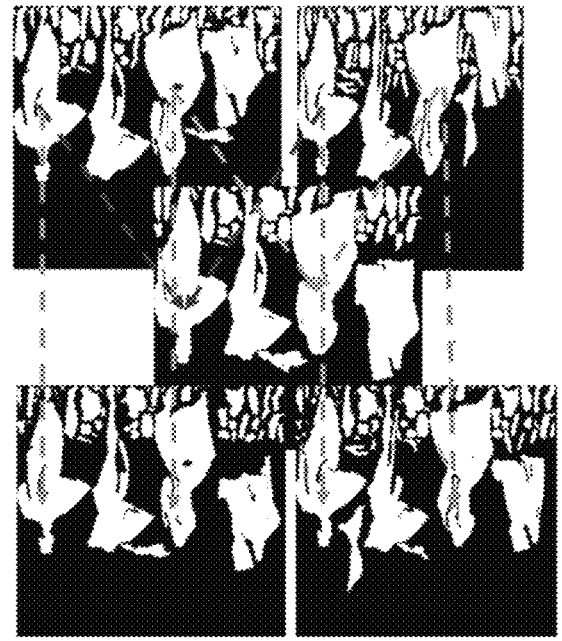
FIG. 9 is a schematic diagram of comparison between occupancy maps that are of point clouds and that are obtained by using the methods shown in FIG. 5 and FIG. 6 according to an embodiment of this application.

FIG. 9 is a schematic diagram of comparison between occupancy maps that are of point clouds and that are obtained by using the methods shown in FIG. 5 and FIG. 6 according to an embodiment of this application. In FIG. 9, two maps on the top are occupancy maps that are of two frames of point clouds and that are obtained by using the method shown in FIG. 5, one map in the middle is a global occupancy map obtained by using the method shown in FIG. 6, and two maps at the bottom are occupancy maps that are of the two frames of point clouds and that are obtained based on a constraint of the global occupancy map. It can be learned from FIG. 9 that, in the occupancy maps that are of the two frames of point clouds and that are obtained by using the method shown in FIG. 5, occupancy maps of four patches with relatively large areas correspondingly have similar spatial locations, while occupancy maps of other patches have disordered locations, and consequently efficient coding cannot be performed based on inter-frame correlation in video coding. According to the method shown in FIG. 6, a location that is of a global matched patch in each frame of point cloud and that is in an occupancy map of the frame of point cloud is constrained by using the global occupancy map, so that not only four large patches correspondingly have a similar (or same) spatial location, but also other global matched patches with relatively small areas correspondingly have a similar (or same) spatial location. This can fully use an advantage of inter prediction in video coding, and improve coding or compression efficiency.

A simple example is used below to describe the packing method in FIG. 6.

Figure 10:
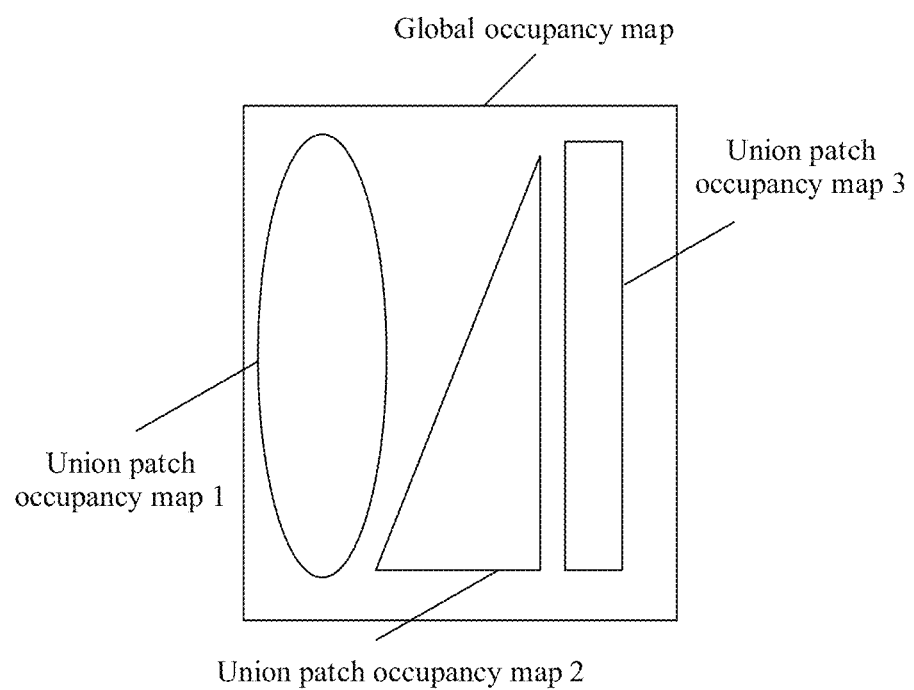
FIG. 10 and FIG. 11 are schematic diagrams of processes on a basis of the packing method provided in FIG. 6 according to an embodiment of this application.
Figure 11:
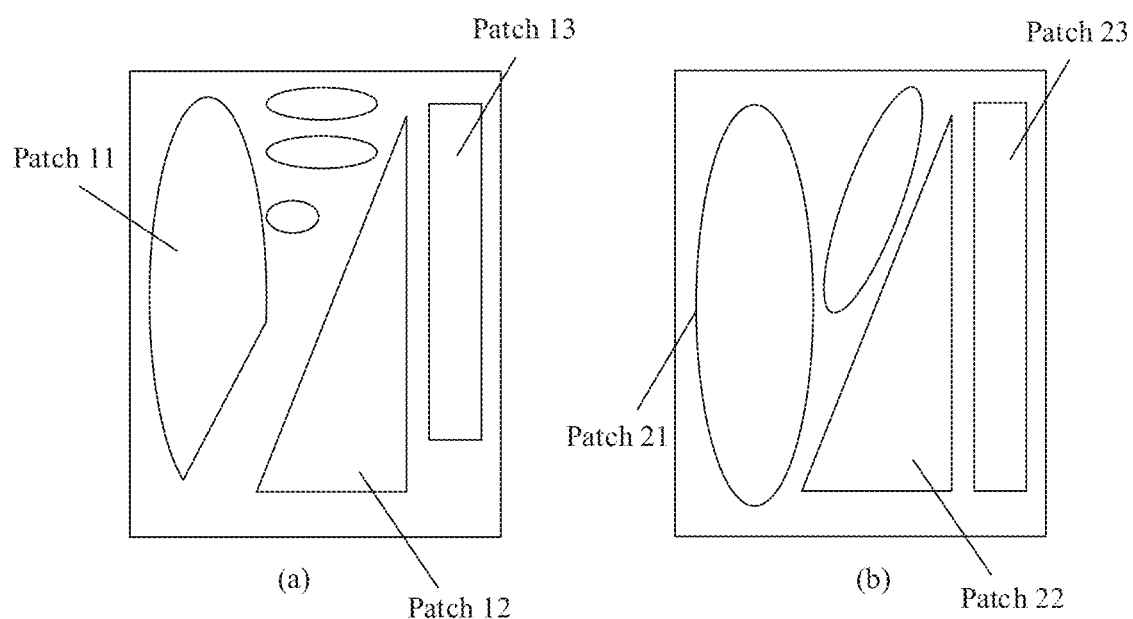

FIG. 10 and FIG. 11 are schematic diagrams of processes on a basis of the packing method provided in FIG. 6. In FIG. 10 and FIG. 11, it is assumed that a point cloud group includes four frames of point clouds, each frame of point cloud includes 10 patches, and global matched patches, obtained in S101, in all the frames of point clouds in the point cloud group are:

a patch 11, a patch 12, and a patch 13 in a point cloud 1;
a patch 21, a patch 22, and a patch 23 in a point cloud 2;
a patch 31, a patch 32, and a patch 33 in a point cloud 3; and
a patch 41, a patch 42, and a patch 43 in a point cloud 4.

The patch 11, the patch 21, the patch 31, and the patch 41 have a matching relationship, and these patches form a set 1. The patch 12, the patch 22, the patch 32, and the patch 42 have a matching relationship, and these patches form a set 2. The patch 13, the patch 23, the patch 33, and the patch 43 have a matching relationship, and these patches form a set 3. In other words, based on this example, the M sets in S102 are the sets 1 to 3, and each set includes four patches having a matching relationship.

Based on this example, a global occupancy map obtained by performing S103 may be shown in FIG. 10. A larger rectangle in FIG. 10 represents the global occupancy map; and an ellipse, a triangle, and a smaller rectangle in FIG. 10 respectively represent union patch occupancy maps corresponding to the sets 1 to 3.

Based on this example, after S104 is performed, an occupancy map of the point cloud 1 may be shown in (a) in FIG. 11, and an occupancy map of the point cloud 2 may be shown in (b) in FIG. 11. FIG. 11 merely shows occupancy maps that are of some patches and that are in the occupancy map of the point cloud 1 and occupancy maps that are of some patches and that are in the occupancy map of the point cloud 2, and does not show occupancy maps of the point cloud 3 and the point cloud 4. It can be learned by comparing FIG. 10 and FIG. 11 that both a location that is of an occupancy map of the patch 11 and that is in the occupancy map of the point cloud 1 and a location that is of an occupancy map of the patch 21 and that is in the occupancy map of the point cloud 2 correspond to a location of a union patch occupancy map 1 in the global occupancy map; both a location that is of an occupancy map of the patch 12 and that is in the occupancy map of the point cloud 1 and a position that is of an occupancy map of the patch 22 and that is in the occupancy map of the point cloud 2 correspond to a location of a union patch occupancy map 2 in the global occupancy map; and both a location that is of an occupancy map of the patch 13 and that is in the occupancy map of the point cloud 1 and a location that is of an occupancy map of the patch 23 and that is in the occupancy map of the point cloud 2 correspond to a location of a union patch occupancy map 3 in the global occupancy map.

In an embodiment, the point cloud group may be one or more GOFs, and is usually one GOF. A quantity of frames of point clouds in one GOF is configurable. The quantity of frames of point clouds included in one GOF is not limited in this embodiment of this application. For example, one GOF may include 32 frames of point clouds. For a manner of determining a GOF, refer to the conventional technology.

In an embodiment, the point cloud group may be a sub-GOF. The sub-GOF may include a plurality of frames of point clouds that are temporally consecutive in one GOF. One GOF may include at least two sub-GOFs. Quantities of frames of point clouds included in any two of the at least two sub-GOFs may be the same or different.

In an embodiment, S101 may include the following operations S101A and S101B.

S101A: Obtain a reference point cloud, where the reference point cloud is any frame of point cloud in the GOF.

S101B: For an $i^{th}$ patch in the reference point cloud, if a patch that matches a target patch exists in each non-reference point cloud in the GOF, determine that the $i^{th}$ patch and a patch that matches the $i^{th}$ patch are global matched patches, where the target patch is the $i^{th}$ patch or the target patch is a matched patch of the $i^{th}$ patch, and the $i^{th}$ patch is any patch in the reference point cloud. Specifically, a patch that matches the target patch is searched in each non-reference point cloud based on an index of each point cloud in the GOF.

It may be understood that a sequence of patches in the reference point cloud in the point cloud group determines a sequence of global matched patches in the point cloud group. Therefore, a sequence of patches in a reference frame is particularly important. The reference frame herein may be a patch array that has undergone a pack operation. The packing operation may change a placement sequence of patches in a patch array. For example, the placement sequence of the patches is updated during obtaining of a global matched patch. The packing operation herein may be the packing method (for example, the method shown in S101 to S104) provided in the embodiments of this application. This helps ensure that global matched patches in two neighboring point cloud groups are temporally consecutive, and improve coding or compression efficiency. Alternatively, the reference frame may be a patch array that has not undergone a pack operation.

In an embodiment, global matched patches in all the frames of point clouds in the point cloud group may be obtained by performing traversing for the $i^{th}$ patch (i=1, 2, . . . , and M). The optional implementation may be applied to an embodiment in which the point cloud group is the GOF, or may be applied to a scenario in which the point cloud group is the sub-GOF. In other words, when the point cloud group is the sub-GOF, any frame of point cloud in a GOF to which the sub-GOF belongs may be used as the reference point cloud.

In an embodiment, when the point cloud group is the GOF, the reference point cloud may be the first frame of point cloud in the GOF. This can ensure that a sequence of all global matched patches in one GOF is consistent with a sequence of global matched patches in the first frame of point cloud in the GOF, and can bring a particular gain in subsequent video coding.

In an embodiment, when the point cloud group is the sub-GOF, the reference point cloud may be the first frame of point cloud in the sub-GOF or any frame of point cloud in a previous sub-GOF of the sub-GOF. The sub-GOF and the previous sub-GOF belong to a same GOF.

In an embodiment, when the point cloud group is the sub-GOF, the reference point cloud is the last frame of point cloud in the previous sub-GOF of the sub-GOF. In this solution, temporal continuity is considered for neighboring sub-GOFs. Therefore, this helps improve coding or compression efficiency.

Figure 12:
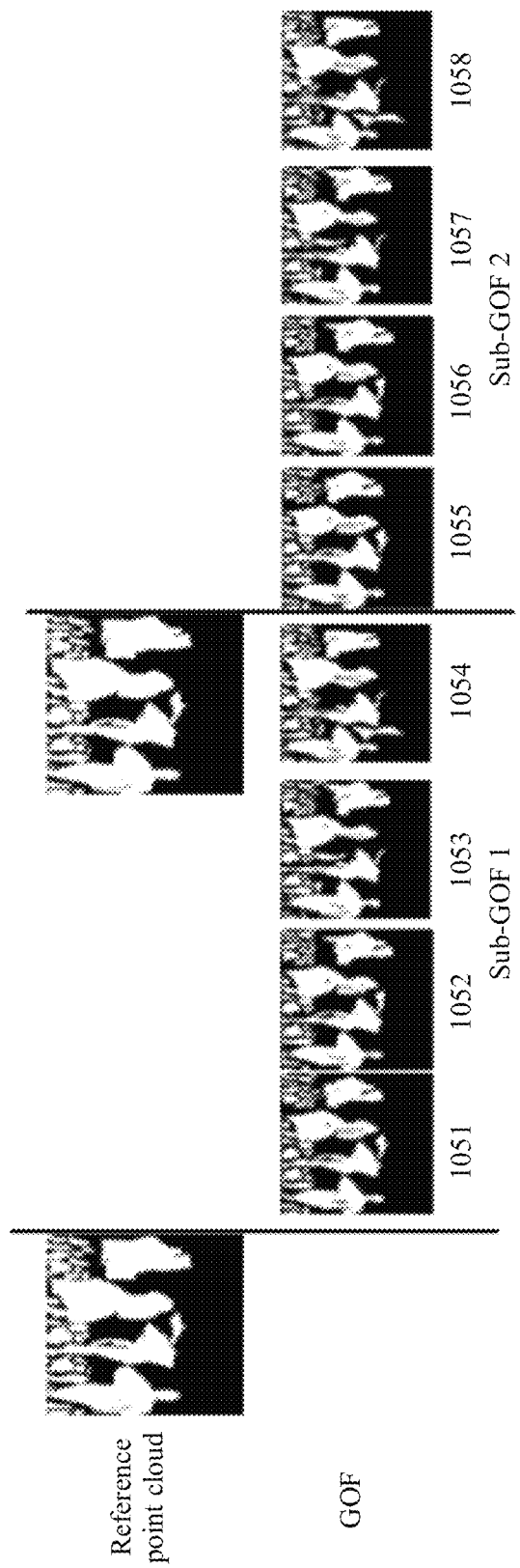
FIG. 12 is a schematic diagram of obtained occupancy maps of all point clouds in two neighboring sub-GOFs according to an embodiment of this application.

Further, in an embodiment, the last frame of point cloud is a point cloud obtained after a packing operation is performed. The packing operation herein may be the packing method (for example, the method shown in S101 to S104) provided in the embodiments of this application. This helps ensure that global matched patches in two neighboring sub-GOFs are temporally consecutive, and improve coding or compression efficiency. FIG. 12 shows occupancy maps of all point clouds in two neighboring sub-GOFs (denoted as a sub-GOF 1 and a sub-GOF 2) obtained based on the further optional implementation. Numbers 1051 to 1058 in FIG. 12 represent indexes of point clouds.

Alternatively, the last frame of point cloud may be a point cloud before a packing operation is performed.

In an embodiment, S104 may include the following operations S104A and S104B.

S104A: Determine, based on the location of the $m^{th}$ union patch occupancy map in the global occupancy map, the location that is of the occupancy map of the $m^{th}$ global matched patch in the $n^{th}$ frame of point cloud and that is in the occupancy map of the $n^{th}$ frame of point cloud. There is a correspondence between the two locations. For a related description of the correspondence between the two locations, refer to the foregoing descriptions.

In S104A, when m is equal to a portion of or all in 1, 2, 3, . . . , and M, locations that are of occupancy maps of a portion of or all global matched patches corresponding to a portion of or all these numbers in the $n^{th}$ frame of point cloud and that are in the occupancy map of the $n^{th}$ frame of point cloud may be obtained.

S104B: Pack occupancy maps of a global matched patch and a non-global matched patches in the $n^{th}$ frame of point cloud based on the locations that are of the occupancy maps of the portion of or all (usually all) the global matched patches in the $n^{th}$ frame of point cloud and that are in the occupancy map of the $n^{th}$ frame of point cloud, to obtain the occupancy map of the $n^{th}$ frame of point cloud. The portion of or all the global matched patches include the $m^{th}$ global matched patch.

In an embodiment, S104B may include the following operations S104B-1 and S104B-2.

S104B-1: Map the occupancy maps of the portion of or all the global matched patches onto an initial occupancy map of the $n^{th}$ frame of point cloud based on the locations that are of the occupancy maps of the portion of or all the global matched patches in the $n^{th}$ frame of point cloud and that are in the occupancy map of the $n^{th}$ frame of point cloud.

A value of the width of the initial occupancy map of the $n^{th}$ frame of point cloud is an initial value of the width of the occupancy map of the $n^{th}$ frame of point cloud, and a value of the height of the initial occupancy map of the $n^{th}$ frame of point cloud is an initial value of the height of the occupancy map of the $n^{th}$ frame of point cloud. For a manner of obtaining an initial value of the width/height of an occupancy map of a point cloud, refer to the foregoing descriptions, or refer to the conventional technology.

S104B-2: Pack occupancy maps of other patches different from the portion of or all the global matched patches in the $n^{th}$ frame of point cloud based on the initial occupancy map that is of the $n^{th}$ frame of point cloud and onto which the occupancy maps of the portion of or all the matched patches are mapped, to obtain the occupancy map of the $n^{th}$ frame of point cloud. For a process of packing the occupancy maps of the other patches, refer to the conventional technology, for example, refer to the packing method shown in FIG. 5.

It may be understood that a process of packing all patches in one frame of point cloud may be considered as a process of updating an occupancy map of the point cloud. For example, based on the packing method shown in FIG. 5, each time an occupancy map of a patch is mapped onto a blank region in an occupancy map of a point cloud, it may be considered that the occupancy map of the point cloud is updated once, until an occupancy map of a last patch is mapped onto the blank region in the occupancy map of the point cloud. In this case, it is considered that a final occupancy map of the point cloud is obtained. Therefore, a process of performing S104B-1 may be considered as a process of updating the initial occupancy map of the point cloud to an intermediate occupancy map of the point cloud (the process is different from that in the conventional technology); and a process of performing S104B-2 may be considered as a process of updating the intermediate occupancy map to a final occupancy map.

A difference between the packing method provided in this optional implementation and the packing method shown in FIG. 5 lies in: In the packing method shown in FIG. 5, all patches in one frame of point cloud are sorted uniformly, and occupancy maps of all the patches are sequentially mapped onto an occupancy map of the point cloud based on a sequence obtained through sorting. In this way, locations that are of the occupancy maps of all the patches and that are in the occupancy map of the point cloud are obtained. In this optional implementation, a location that is of an occupancy map of a global matched patch in one frame of point cloud and that is in an occupancy map of the point cloud is first determined, then occupancy maps of all global matched patches are mapped onto the occupancy map of the point cloud, and then locations of occupancy maps of all non-global matched patches in the occupancy map of the point cloud are sequentially obtained. In this way, the locations of occupancy maps of all the non-global matched patches in the occupancy map of the point cloud are obtained.

It may be understood that, if the height of the global occupancy map is excessively large, the occupancy maps of the N frames of point clouds in the point cloud group may be excessively large. Consequently, performance deteriorates when video-based/image-based encoding is performed on a depth map and a texture map of each frame of point cloud subsequently. In this case, packing performed by using the conventional technology (for example, the packing method shown in FIG. 5) does not deteriorate the encoding performance. Therefore, in an optional embodiment, the method further includes: determining whether to use the global occupancy map (that is, whether the foregoing method provided in this embodiment of this application is used) to perform packing. For this, if a maximum value of heights of all frames of point clouds in the point cloud group is basically equivalent to the height of the global occupancy map, a bigger coding gain may be obtained by performing packing by using the method provided in this embodiment of this application. Otherwise, another packing method, for example, the packing method shown in FIG. 5, may be used to perform packing.

Based on this idea, the following provides several implementations provided in the embodiments of this application.

Manner 1 includes the following operations A-1 and A-2.

Operation A-1: Pre-pack an occupancy map of a patch in a first portion of point clouds in the N frames of point clouds according to a pre-packing algorithm, to obtain a pre-occupancy map of the first portion of point clouds, where the pre-packing algorithm is an algorithm used for packing without using the global occupancy map.

Operation A-2: When a difference between a maximum size (for example, the height) of the pre-occupancy map of the first portion of point clouds and a size (for example, the height) of the global occupancy map falls within a preset range, determine that a method for packing each of the N frames of point clouds is to pack each of the N frames of point clouds by using the global occupancy map; otherwise, determine that a method for packing each of the N frames of point clouds is the pre-packing algorithm.

The first portion of point clouds are any frame or a plurality of frames of point clouds in the N frames of point clouds. The pre-packing algorithm is a packing method not provided in the embodiments of this application. For example, the packing method may be the packing method shown in FIG. 5.

If the first portion of point clouds include the plurality of frames of point clouds, after pre-packing is performed, each of the plurality of frames of point clouds corresponds to one pre-occupancy map. The maximum size of the pre-occupancy map of the first portion of point clouds is a maximum size (for example, a maximum height) of a pre-occupancy map in a plurality of pre-occupancy maps corresponding to the plurality of frames of point clouds.

The preset range may be determined based on a coding gain, and may be an empirical value. That a difference between a maximum size of the pre-occupancy map of the first portion of point clouds and a size of the global occupancy map falls within a preset range may be understood as: A maximum height of the pre-occupancy map of the first portion of point clouds is basically equivalent to the height of the global occupancy map.

Manner 2 includes the following operations B-1 and B-2.

Operation B-1: Pre-pack an occupancy map of a patch in a first portion of point clouds in the N frames of point clouds according to a pre-packing algorithm, to obtain a pre-occupancy map of the first portion of point clouds, where the pre-packing algorithm is an algorithm used for packing without using the global occupancy map.

Operation B-2: Pre-pack an occupancy map of a patch in a second portion of point clouds in the N frames of point clouds by using the global occupancy map, to obtain a pre-occupancy map of the second portion of point clouds.

Operation B-3: When a difference between a maximum size (for example, the height) of the pre-occupancy map of the first portion of point clouds and a maximum size (for example, the height) of the pre-occupancy map of the second portion of point clouds falls within a preset range, determine that a method for packing each of the N frames of point clouds is to pack each of the N frames of point clouds by using the global occupancy map; otherwise, determine that a method for packing each of the N frames of point clouds is the pre-packing algorithm.

The first portion of point clouds are any frame or a plurality of frames of point clouds in the N frames of point clouds. The pre-packing algorithm is a packing method not provided in the embodiments of this application. For example, the packing method may be the packing method shown in FIG. 5.

The second portion of point clouds may be any frame or a plurality of frames of point clouds in the N frames of point clouds. In an embodiment, the first portion of point clouds are the same as the second portion of point clouds. This helps better compare the technical solutions provided in the embodiments of this application and the conventional technology.

Manner 3 is to determine, according to a rate-distortion cost criterion, to use the global occupancy map to pack each of the N frames of point clouds.

In an embodiment, pre-pack an occupancy map of a patch in a portion of or all point clouds in the N frames of point clouds according to a pre-packing algorithm, to obtain a first pre-occupancy map of the portion of or all the point clouds; pre-pack an occupancy map of a patch in the portion of or all the point clouds by using the global occupancy map, to obtain a second pre-occupancy map of the portion of or all the point clouds; and when bitstream transmission overheads for the second pre-occupancy map are lower than or equal to bitstream bit overheads for the first pre-occupancy map, or when bitstream transmission overheads for the second pre-occupancy map are higher than bitstream bit overheads for the first pre-occupancy map, but a difference between the bitstream transmission overheads and the bitstream bit overheads falls within a preset range, determine that a method for packing each of the N frames of point clouds is to pack each of the N frames of point clouds by using the global occupancy map; otherwise, determine that a method for packing each of the N frames of point clouds is the pre-packing algorithm.

Figure 13:
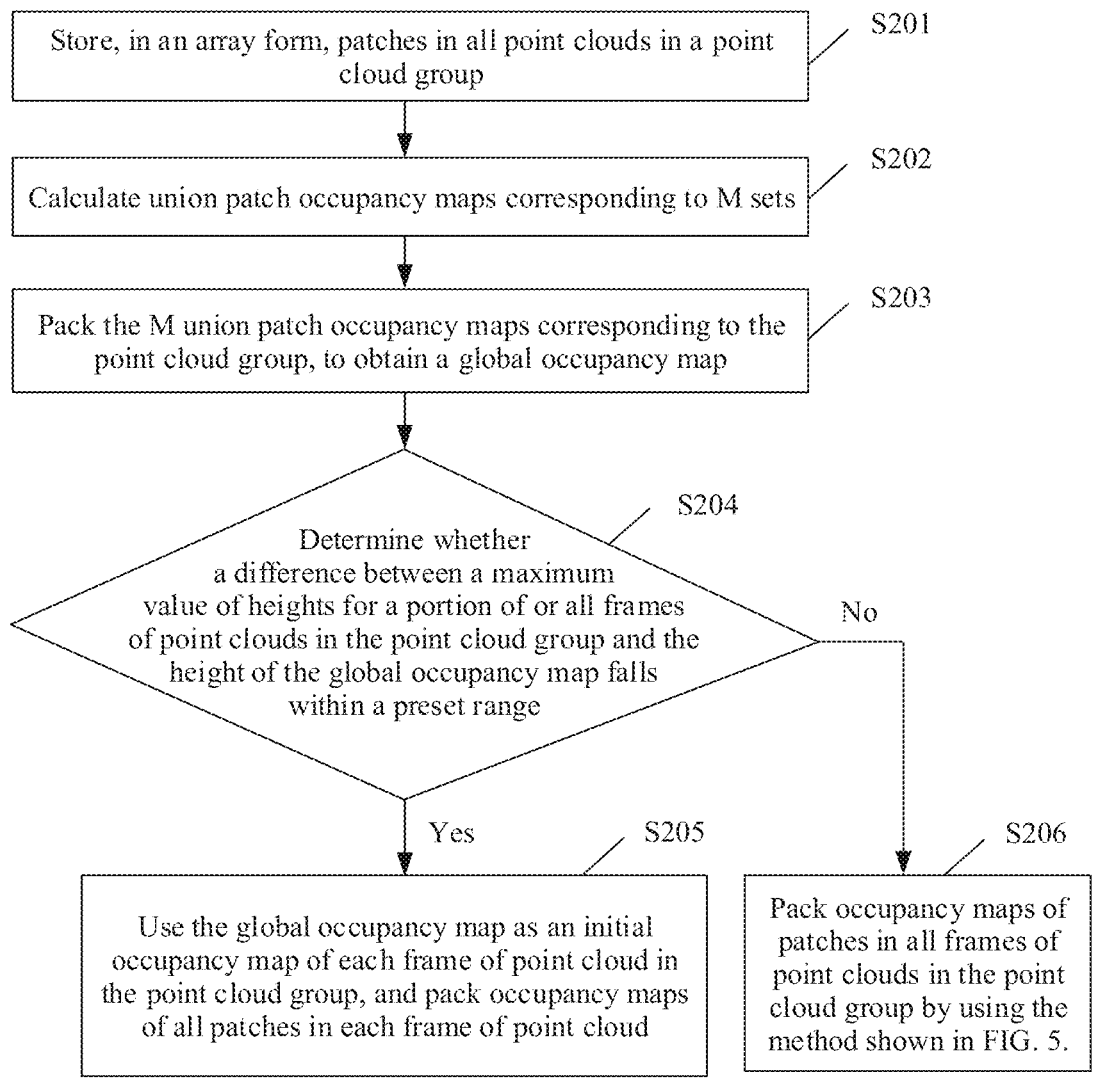
FIG. 13 is a schematic flowchart of another point cloud encoding method according to an embodiment of this application.

FIG. 13 is a schematic flowchart of a packing method according to an embodiment of this application. This embodiment may be considered as a specific example of the packing method provided in FIG. 6. The method includes the following operations.

S201: Store, in an array form, patches in all point clouds in a point cloud group. A global matched patch in a point cloud is arranged before a non-global matched patch. In other words, a serial number of an array including the global matched patch is less than a serial number of an array including the non-global matched patch. Certainly, specific implementation is not limited thereto.

In this embodiment, the point cloud group is a GOF. One GOF includes N frames of point clouds, for example, N=32. A quantity of global matched patches in each frame of point cloud in one GOF is M. M is denoted as GobalPatchCount in the following program.

S202: Calculate union patch occupancy maps (unionPatch) corresponding to M sets. For related descriptions of a global matched patch included in each set, refer to the foregoing descriptions. S202 may include:

First, all global matched patches in an $i^{th}$ frame of point cloud are traversed, where i=0, 1, 2, 3, . . . , and 31. A program used for obtaining the width and the height of a $i^{th}$ union patch occupancy map based on a $j^{th}$ global matched patch in the $i^{th}$ frame of point cloud may be as follows:

For i=0, . . . , N−1 do
    Patch=frame[i].patches;
    maxU0=maxV0=0;
    For j=0, . . . , GlobalPatchCount−1 do
        unionPatch[j].sizeU0=max(maxU0,Patch[j].sizeU0)
    unionPatch[j].sizeV0=max(maxV0,Patch[j].sizeV0)
    End for
End for Second, all the global matched patches in the $i^{th}$ frame of point cloud are traversed, and the $j^{th}$ union patch occupancy map is calculated for the $j^{th}$ global matched patch. In an embodiment, resolution of the union patch occupancy map may be 16*16.

A program used for obtaining the $j^{th}$ union patch occupancy map may be as follows:

```
For i = 0, ..., N−1 do
    Patch = frame[i].patches;
    For j = 0, ..., GlobalPatchCount−1 do
        For v = 0,..., unionPatch[j].sizeV0−1 do
            For u = 0,..., unionPatch[j].sizeU0−1 do
                p = v*Patch[j].sizeU0 + u; //The location in occupancy
map of current frame.
                up = v*unionPatch[j].sizeU0 + u;
                unionPatch[j].occupancy[up] = (Patch[j].occupancy[p] ==
true ? true: unionPatch[j].occupancy[up]);
            End for
        End for
    End for
End for
```

S203: Pack the M union patch occupancy maps corresponding to the point cloud group, to obtain a global occupancy map (occupancymap).

For a packing method, refer to the method shown in FIG. 5. After this operation is performed, location coordinates, namely, values of u0 and v0, of each union patch occupancy map in the global occupancy map may be determined.

S204: Determine whether a difference between a maximum value of heights for a portion of or all frames of point clouds in the point cloud group and the height of the global occupancy map falls within a preset range. If the difference falls within the preset range, it indicates that the maximum value of the heights for the frames of point clouds in the point cloud group is basically equivalent to the height of the global occupancy map, and S205 is performed. If the difference falls beyond the preset range, S206 is performed.

S204 includes the following operations:

S204A: Calculate the height of the global occupancy map. Assuming that the height of the global occupancy map is globalOCMPHeight and the $j^{th}$ union patch occupancy map is unionPatch[j], where j=0, 1, 2 . . . , and globalPatchCount−1, globalOCMPHeight=max globalOCMPHeight, unionPatch[j].v0+unionPatch[j].sizeV01.

S204B: Pack occupancy maps of global matched patches in the portion of or all the frames of point clouds in the point cloud group by using the method shown in FIG. 5, and obtain the height frame[i].height of an occupancy map of the $i^{th}$ frame of point cloud. A calculation manner may be as follows:

frame[$i$].height=max(frame[$i$].height,frame
[$i$].Patch[$j$].$v$0+unionPatch[$j$].sizeV0)

frame[i].Patch[j] represents kith patch in the $i^{th}$ frame of point cloud.

The global matched patch in operation S204B may also be replaced with a non-global matched patch, or replaced with both a global matched patch and a non-global matched patch.

S204C: Calculate a maximum value maxHeight for heights of occupancy maps of the portion of or all the point clouds. The portion of or all the frames of point clouds may be one frame of point cloud, for example, the 0th frame of point cloud, . . . , or the (N−1)th frame of point cloud in the point cloud group. The portion of or all the frames of point clouds may be two frames of point clouds, for example, the 0th and the Pt frames of point clouds, or the (N−2)th and the (N−1)th frames of point clouds in the point cloud group. Certainly, this is not limited in this embodiment of this application.

S204D: Set a determining condition, and introduce an identifier usingGlobalPatchPacking. If globalOCMPHeight>maxHeight*w, where w is a weight factor, and w may be a value greater than 1.0, for example, 1.1, when usingGlobalPatchPacking=0 is set, packing is performed by using the method provided in the conventional technology (for example, the method shown in FIG. 5). Otherwise, when usingGlobalPatchPacking=1 is set, packing is performed by using the method (for example, the method shown in FIG. 6) provided in the embodiments of this application.

S205: Use the global occupancy map as an initial occupancy map of each frame of point cloud in the point cloud group, and pack occupancy maps of all patches in each frame of point cloud. All the frames of point clouds in the point cloud group are traversed, and the following operations S205A and S205B are performed for the $i^{th}$ frame of point cloud:

S205A: Determine locations, in an occupancy map of the $i^{th}$ frame of point cloud, of occupancy maps of first globalPatchCount global matched patches in a patch array in the $i^{th}$ frame of point cloud by using the following manner:

frame[$i$].patch[$j$].$u0$=unionPatch[$j$].$u0$;

frame[$i$].patch[$j$].$v0$=unionPatch[$j$].$v0$.

frame[i].patch[j] represents the $j^{th}$ patch in the $i^{th}$ frame of point cloud, where j=0, . . . , and globalPatchCount−1.

S205B: Sequentially pack remaining patches in the patch array in the $i^{th}$ frame of point cloud into the occupancy map of the $i^{th}$ frame of point cloud by using a packing method shown in FIG. 5.

A program used for updating the occupancy map of the $i^{th}$ frame of point cloud may be as follows:

```
For i = 0, ..., N-1 do
    Patch = frame[i].patches;
    For j = 0, ..., GlobalPatchCount-1 do
        For v = 0, ..., unionPatch[j].sizeV0-1 do
            For u = 0, ..., unionPatch[j].sizeU0-1 do
                p = v*Patch[j].sizeU0 + u
                up = (unionPatch[j].v0 + v)*unionPatch[j].sizeU0 +
                unionPatch[j].u0 + u
                frame[i].occupancymap[up] = (Patch[j].occupancy[p] ==
    false ? false: frame[i].occupancymap[up])
            end
        end
    end
end
```

After S205 is performed, the process ends.

S206: Pack occupancy maps of patches in all the frames of point clouds in the point cloud group by using the method shown in FIG. 5.

It should be noted that, if a point cloud in a GOF does not dynamically change greatly, patches obtained by partitioning all frames in the GOF are very similar. In this case, the technical solutions provided in the embodiments of this application may be performed based on a GOF. In other words, in this case, the point cloud group may be a GOF.

If a point cloud in a GOF dynamically changes greatly, shapes of patches having a matching relationship in two neighboring frames of point clouds may change greatly. In this case, if the point cloud encoding method provided in the embodiments of this application is performed based on a GOF, there are relatively large blank regions in an obtained union patch occupancy map compared with global matched patches used to obtain the union patch occupancy map, and the regions cause a very large height of a global occupancy map that is obtained by packing a plurality of union patch occupancy maps. Consequently, it is unfavorable to subsequent video coding. Therefore, in this case, one GOF may be divided into K sub-GOFs. In other words, the point cloud group may be a sub-GOF. K is an integer greater than or equal to 2. In an embodiment, K is 2, 4, 8, 16, . . . , and N/2. In an embodiment, remaining frames of the N frames of point clouds smaller than one sub-GOF are used as one sub-GOF.

The foregoing mainly describes the solutions provided in the embodiments of this application from a perspective of the method. To implement the foregoing functions, corresponding hardware structures and/or software modules for performing the functions are included. A person skilled in the art should be easily aware that units and algorithm operations in the examples described with reference to the embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, an encoder may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, division into modules is an example, is merely logical function division, and may be other division in an actual implementation.

Figure 14:
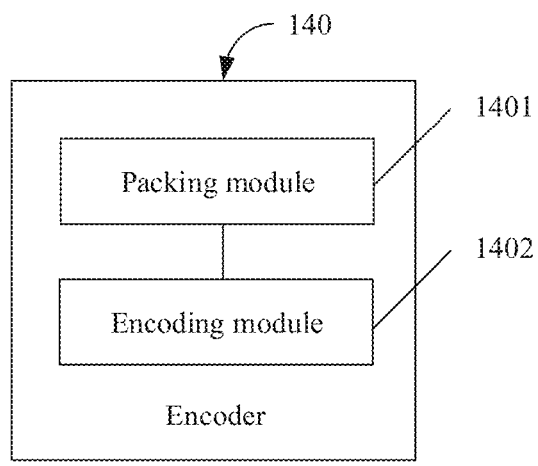
FIG. 14 is a schematic block diagram of an encoder according to an embodiment of this application.

FIG. 14 is a schematic block diagram of an encoder 1400 according to an embodiment of this application. The encoder 1400 may include a packing module 1401 and an encoding module 1402. In an example, the packing module 1401 may correspond to the packing module 102 in FIG. 2. An occupancy map, generated by the packing module 1401, of a point cloud is sent to the depth map generation module 103, the texture map generation module 104, and the second filling module 111. A module that receives the occupancy map of the point cloud cooperates with a module that is connected to or communicates with the module, to complete an encoding function, for example, encode the N frames of point clouds based on the occupancy maps of the N frames of point clouds. For a specific encoding function, refer to the conventional technology or the foregoing descriptions of a principle of the encoder shown in FIG. 2. Details are not described herein again.

In an embodiment, the packing module 1401 is configured to perform the following operations: obtaining global matched patches in all frames of point clouds in a point cloud group, where the point cloud group includes N frames of point clouds, N≥2, and N is an integer; determining M union patch occupancy maps corresponding to M sets, where each of the M sets includes N global matched patches, the N global matched patches are patches that have a matching relationship and that are in the N frames of point clouds, a union patch occupancy map corresponding to an $m^{th}$ set in the M sets is a union set of occupancy maps of all global matched patches in the $m^{th}$ set, 1≤m≤M, and both m and M are integers; packing the M union patch occupancy maps to obtain a global occupancy map, where the global occupancy map is used to determine locations of the M union patch occupancy maps in the global occupancy map; and packing each of the N frames of point clouds to obtain occupancy maps of the N frames of point clouds, where a location that is of an occupancy map of an $m^{th}$ global matched patch in an $n^{th}$ frame of point cloud and that is in an occupancy map of the $n^{th}$ frame of point cloud corresponds to a location that is of an $m^{th}$ union patch occupancy map in the M union patch occupancy maps and that is in the global occupancy map. The encoding module 1402 is configured to encode the N frames of point clouds based on the occupancy maps of the N frames of point clouds. For example, with reference to FIG. 6, the packing module 1401 may be configured to perform S101 to S104, and the encoding module 1402 may be configured to perform S105.

In an embodiment, the packing module 1401 is configured to: determine, based on the location of the $m^{th}$ union patch occupancy map in the global occupancy map, the location that is of the occupancy map of the $m^{th}$ global matched patch in the $n^{th}$ frame of point cloud and that is in the occupancy map of the $n^{th}$ frame of point cloud; and pack occupancy maps of a global matched patch and a non-global matched patch in the $n^{th}$ frame of point cloud based on locations that are of occupancy maps of a portion of or all global matched patches in the $n^{th}$ frame of point cloud and that are in the occupancy map of the $n^{th}$ frame of point cloud, to obtain the occupancy map of the $n^{th}$ frame of point cloud, where the portion of or all the global matched patches include the $m^{th}$ global matched patch.

In an embodiment, the packing module 1401 is configured to: map the occupancy maps of the portion of or all the global matched patches onto an initial occupancy map of the $n^{th}$ frame of point cloud based on the locations that are of the occupancy maps of the portion of or all the global matched patches and that are in the occupancy map of the $n^{th}$ frame of point cloud; and pack occupancy maps of other patches different from the portion of or all the global matched patches in the $n^{th}$ frame of point cloud based on the initial occupancy map that is of the $n^{th}$ frame of point cloud and onto which the occupancy maps of the portion of or all the patches are mapped, to obtain the occupancy map of the $n^{th}$ frame of point cloud.

In an embodiment, the occupancy map of the non-global matched patch in the $n^{th}$ frame of point cloud occupies a preset location range, or does not occupy a preset location range, where the preset location range is a location range that belongs to a union patch occupancy map corresponding to a set including the global matched patch in the $n^{th}$ frame of point cloud, but does not belong to the occupancy map of the global matched patch in the $n^{th}$ frame of point cloud.

In an embodiment, the packing module 1401 is configured to: when a difference between a maximum size of a pre-occupancy map of a first portion of point clouds in the N frames of point clouds and a size of the global occupancy map falls within a preset range, pack each of the N frames of point clouds by using the global occupancy map. For a related description of the pre-occupancy map of the first portion of point clouds, refer to the foregoing descriptions.

In an embodiment, the packing module 1404 is configured to: when a difference between a maximum size of a pre-occupancy map of a first portion of point clouds in the N frames of point clouds and a maximum size of a pre-occupancy map of a second portion of point clouds in the N frames of point clouds falls within a preset range, pack each of the N frames of point clouds by using the global occupancy map. For related descriptions of the pre-occupancy map of the first portion of point clouds and the pre-occupancy map of the second portion of point clouds, refer to the foregoing descriptions.

In an embodiment, the point cloud group is a group of frames GOF; or the point cloud group is a sub-GOF, and the sub-GOF includes a plurality of frames of point clouds that are temporally consecutive in one GOF. The packing module 1401 is configured to: obtain a reference point cloud, where the reference point cloud is any frame of point cloud in the GOF; and for an $i^{th}$ patch in the reference point cloud, if a patch that matches a target patch exists in each non-reference point cloud in the GOF, determine that the $i^{th}$ patch and a patch that matches the $i^{th}$ patch are global matched patches, where the target patch is the $i^{th}$ patch or the target patch is a matched patch of the $i^{th}$ patch, and the $i^{th}$ patch is any patch in the reference point cloud.

In an embodiment, when the point cloud group is the GOF, the reference point cloud is the first frame of point cloud in the GOF.

In a feasible implementation, when the point cloud group is the sub-GOF, the reference point cloud is the first frame of point cloud in the sub-GOF or any frame of point cloud in a previous sub-GOF of the sub-GOF.

In an embodiment, the reference point cloud is the last frame of point cloud in the previous sub-GOF of the sub-GOF.

In an embodiment, the last frame of point cloud is a point cloud obtained after a packing operation is performed.

It may be understood that the modules in the encoder in this embodiment of this application are functional entities implementing various execution operations included in the corresponding point cloud encoding method in this application, that is, functional entities implementing all the operations in the corresponding point cloud encoding method in this application and extensions and variations of these operations. For brevity, details are not described in this specification again.

Figure 15:
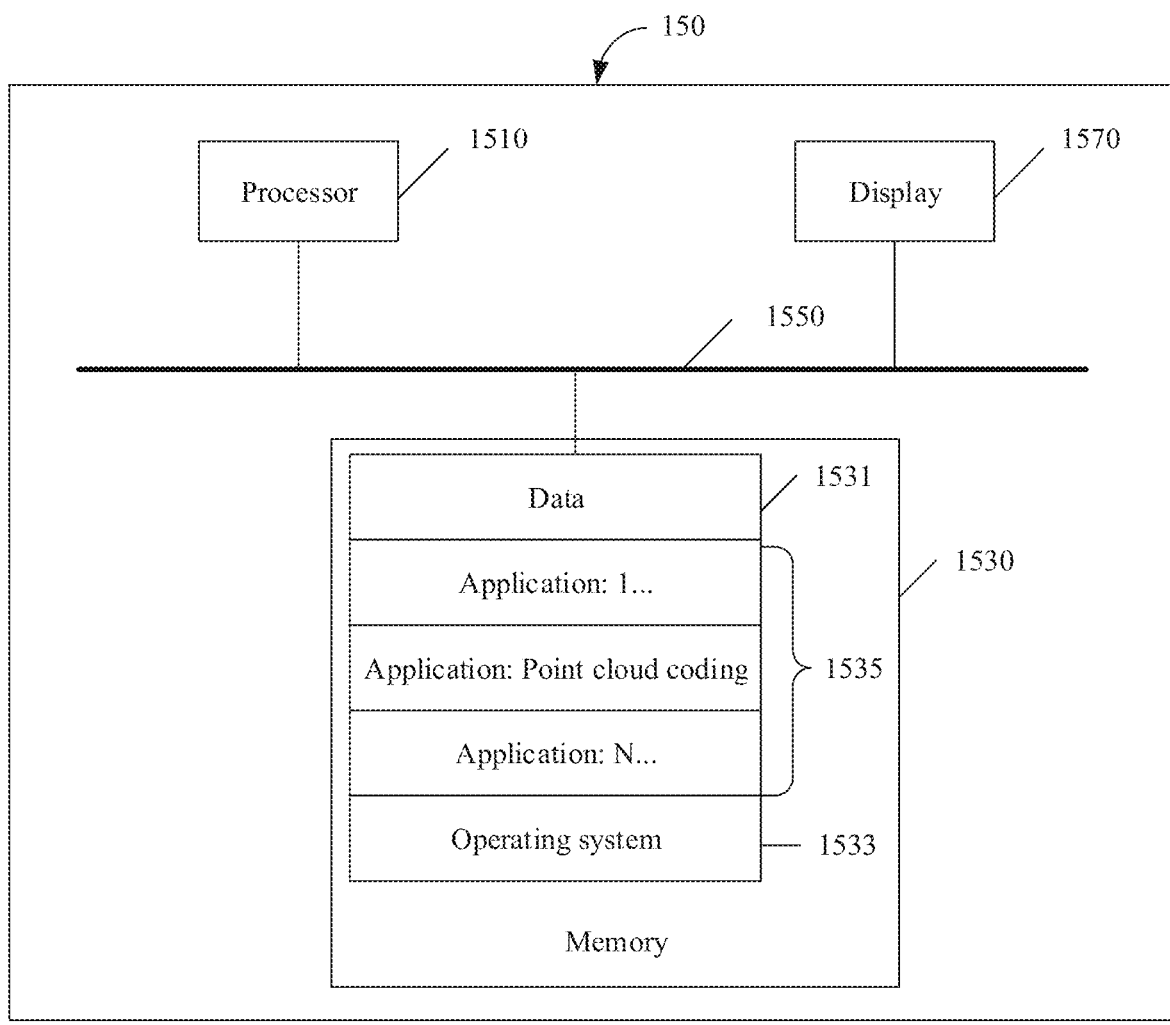
FIG. 15 is a schematic block diagram of an implementation of an encoding device according to an embodiment of this application.

FIG. 15 is a schematic block diagram of an implementation of an encoding device 1500 according to an embodiment of this application. The encoding device 1500 may include a processor 1510, a memory 1530, and a bus system 1550. The processor 1510 and the memory 1530 are connected through the bus system 1550. The memory 1530 is configured to store an instruction. The processor 1510 is configured to execute the instruction stored in the memory 1530, to perform various point cloud encoding methods described in this application. To avoid repetition, details are not described herein again.

In an embodiment of this application, the processor 1510 may be a central processing unit (CPU), or the processor 1510 may be another general-purpose processor, a DSP, an ASIC, an FPGA, another programmable logic device, a discrete gate, a transistor logic device, a discrete hardware component, or the like. The general-purpose processor may be a microprocessor, or the processor may be any conventional processor or the like.

The memory 1530 may include a ROM device or a RAM device. Any other proper type of storage device may also be used as the memory 1530. The memory 1530 may include code and data 1531 that are accessed by the processor 1510 through the bus 1550. The memory 1530 may further include an operating system 1533 and an application program 1535. The application program 1535 includes at least one program that allows the processor 1510 to perform the point cloud encoding method described in this application (especially a method for filtering a current image block based on a block size of the current image block described in this application). For example, the application programs 1535 may include applications 1 to N, and further include a point cloud encoding or decoding application (referred to as a point cloud coding application for short) used to perform the point cloud encoding method described in this application.

In addition to a data bus, the bus system 1550 may further include a power bus, a control bus, a status signal bus, and the like. However, for clear description, the buses are all marked as the bus system 1550 in the figure.

In an embodiment, the encoding device 1500 may further include one or more output devices, for example, a display 1570. In an example, the display 1570 may be a touch sensitive display that combines a display and a touch sensitive unit that is operable to sense a touch input. The display 1570 may be connected to the processor 1510 through the bus 1550.

A person skilled in the art can understand that, the functions described with reference to various illustrative logical blocks, modules, and algorithm operations disclosed and described in this specification can be implemented by hardware, software, firmware, or any combination thereof. If implemented by software, the functions described with reference to the illustrative logical blocks, modules, and operations may be stored in or transmitted over a computer-readable medium as one or more instructions or code and executed by a hardware-based processing unit. The computer-readable medium may include a computer-readable storage medium, which corresponds to a tangible medium such as a data storage medium, or may include any communications medium that facilitates transmission of a computer program from one place to another (for example, according to a communications protocol). In this manner, the computer-readable medium may generally correspond to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example but not limitation, such computer-readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of an instruction or a data structure and that can be accessed by a computer. In addition, any connection is properly referred to as a computer-readable medium. For example, if an instruction is transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a DVD, and a Blu-ray disc. The disks usually reproduce data magnetically, whereas the discs reproduce data optically by using lasers. Combinations of the foregoing items should also be included in the scope of the computer-readable media.

An instruction may be executed by one or more processors such as one or more digital signal processors (DSP), general-purpose microprocessors, application-specific integrated circuits (ASIC), field programmable gate arrays (FPGA), or other equivalent integrated or discrete logic circuits. Therefore, the term "processor" used in this specification may be any of the foregoing structures or any other structure suitable for implementing the technologies described in this specification. In addition, in some aspects, the functions described with reference to the illustrative logical blocks, modules, and operations described in this specification may be provided within dedicated hardware and/or software modules configured for encoding and decoding, or may be incorporated into a combined codec. In addition, the technologies may all be implemented in one or more circuits or logic elements. In an example, various illustrative logical blocks, units, and modules in the encoder 100 and the decoder 200 may be understood as corresponding circuit devices or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of the apparatuses configured to implement the disclosed technologies, but are not necessarily implemented by different hardware units. Actually, as described above, various units may be combined into a codec hardware unit in combination with appropriate software and/or firmware, or may be provided by interoperable hardware units (including one or more processors described above).

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A point cloud encoding method, comprising:
    obtaining global matched patches of N frames of point clouds of a point cloud group, wherein N≥2 and N is an integer;
    determining M union patch occupancy maps corresponding to M sets, wherein each of the M sets comprises N global matched patches having a matching relationship in the N frames of point clouds, wherein a union patch occupancy map corresponding to an $m^{th}$ set in the M sets is a union set of occupancy maps of all global matched patches in the $m^{th}$ set, 1≤m≤M, and both m and M are integers;
    packing the M union patch occupancy maps to obtain a global occupancy map used to determine locations of the M union patch occupancy maps in the global occupancy map;
    packing occupancy maps of a global matched patch and a non-global matched patch in each of the N frames of point clouds by using the global occupancy map, to obtain occupancy maps of the N frames of point clouds; and
    encoding the N frames of point clouds based on the occupancy maps of the N frames of point clouds.

2. The point cloud encoding method according to claim 1, wherein a location that is of an occupancy map of an $m^{th}$ global matched patch in an $n^{th}$ frame of point cloud in the N frames of point clouds and that is in an occupancy map of the $n^{th}$ frame of point cloud corresponds to a location that is of an $m^{th}$ union patch occupancy map in the M union patch occupancy maps and that is in the global occupancy map, 1≤n≤N, and n is an integer.

3. The point cloud encoding method according to claim 2, wherein the packing occupancy maps of a global matched patch and a non-global matched patch comprises:
    determining, based on the location of the $m^{th}$ union patch occupancy map in the global occupancy map, the location that is of the occupancy map of the $m^{th}$ global matched patch in the $n^{th}$ frame of point cloud and that is in the occupancy map of the $n^{th}$ frame of point cloud; and packing occupancy maps of a global matched patch and a non-global matched patch in the $n^{th}$ frame of point cloud based on locations that are of occupancy maps of at least a portion of global matched patches in the $n^{th}$ frame of point cloud and that are in the occupancy map of the $n^{th}$ frame of point cloud, to obtain the occupancy map of the $n^{th}$ frame of point cloud, wherein the at least a portion of the global matched patches comprise the $m^{th}$ global matched patch.

4. The point cloud encoding method according to claim 3, wherein the packing occupancy maps of a global matched patch and a non-global matched patch in the $n^{th}$ frame of point cloud based on locations that are of occupancy maps of at least a portion of global matched patches in the $n^{th}$ frame of point cloud and that are in the occupancy map of the $n^{th}$ frame of point cloud, to obtain the occupancy map of the $n^{th}$ frame of point cloud comprises:

mapping the occupancy maps of the at least a portion of the global matched patches onto an initial occupancy map of the $n^{th}$ frame of point cloud based on the locations that are of the occupancy maps of the portion of or all the global matched patches and that are in the occupancy map of the $n^{th}$ frame of point cloud; and packing occupancy maps of other patches different from the at least a portion of the global matched patches in the $n^{th}$ frame of point cloud based on the initial occupancy map that is of the $n^{th}$ frame of point cloud and onto which the occupancy maps of the at least a portion of the patches are mapped, to obtain the occupancy map of the $n^{th}$ frame of point cloud.

5. The point cloud encoding method according to claim 3, wherein the occupancy map of the non-global matched patch in the $n^{th}$ frame of point cloud occupies a preset location range, or does not occupy a preset location range, wherein the preset location range belongs to a union patch occupancy map corresponding to a set comprising the global matched patch in the $n^{th}$ frame of point cloud, but does not belong to the occupancy map of the global matched patch in the $n^{th}$ frame of point cloud.

6. The point cloud encoding method according to claim 1, wherein the packing occupancy maps of a global matched patch and a non-global matched patch comprises:

when a difference between a maximum size of a pre-occupancy map of a first portion of point clouds in the N frames of point clouds and a size of the global occupancy map falls within a preset range, packing the occupancy maps of the global matched patch and the non-global matched patch in each of the N frames of point clouds by using the global occupancy map.

7. The point cloud encoding method according to claim 1, wherein the packing occupancy maps of a global matched patch and a non-global matched patch comprises:

when a difference between a maximum size of a pre-occupancy map of a first portion of point clouds in the N frames of point clouds and a maximum size of a pre-occupancy map of a second portion of point clouds in the N frames of point clouds falls within a preset range, packing the occupancy maps of the global matched patch and the non-global matched patch in each of the N frames of point clouds by using the global occupancy map.

8. The point cloud encoding method according to claim 1, wherein the point cloud group is a group of frames (GOF); or the point cloud group is a sub-GOF comprising a plurality of frames of point clouds that are temporally consecutive in one GOF; and the obtaining global matched patches of the N frames of point clouds comprises:

obtaining a reference point cloud that is any frame of point cloud in the GOF; and for an $i^{th}$ patch in the reference point cloud, if a patch that matches a target patch exists in each non-reference point cloud in the GOF, determining that the $i^{th}$ patch and the patch that matches the target patch are global matched patches, wherein the target patch is the $i^{th}$ patch or the target patch is a matched patch of the $i^{th}$ patch, and the $i^{th}$ patch is any patch in the reference point cloud.

9. The point cloud encoding method according to claim 8, wherein when the point cloud group is the GOF, the reference point cloud is the first frame of point cloud in the GOF; or when the point cloud group is the sub-GOF, the reference point cloud is the first frame of point cloud in the sub-GOF or any frame of point cloud in a previous sub-GOF of the sub-GOF.

10. The point cloud encoding method according to claim 9, wherein the reference point cloud is the last frame of point cloud in the previous sub-GOF of the sub-GOF.

11. The point cloud encoding method according to claim 10, wherein the last frame of point cloud is a point cloud obtained after a packing operation is performed.

12. An encoding apparatus, comprising:
a memory containing instructions; and
a processor in communication with the memory and upon execution of the instructions, is configured to:
obtain global matched patches of N frames of point clouds of a point cloud group, wherein N≥2 and N is an integer;
determine M union patch occupancy maps corresponding to M sets, wherein each of the M sets comprises N global matched patches having a matching relationship in the N frames of point clouds, wherein a union patch occupancy map corresponding to an $m^{th}$ set in the M sets is a union set of occupancy maps of all global matched patches in the $m^{th}$ set, 1≤m≤M, and both m and M are integers;
pack the M union patch occupancy maps to obtain a global occupancy map used to determine locations of the M union patch occupancy maps in the global occupancy map; and
pack occupancy maps of a global matched patch and a non-global matched patch in each of the N frames of point clouds by using the global occupancy map, to obtain occupancy maps of the N frames of point clouds; and encode the N frames of point clouds based on the occupancy maps of the N frames of point clouds.

13. The encoding apparatus according to claim 12, wherein a location that is of an occupancy map of an $m^{th}$ global matched patch in an $n^{th}$ frame of point cloud in the N frames of point clouds and that is in an occupancy map of the $n^{th}$ frame of point cloud corresponds to a location that is of an $m^{th}$ union patch occupancy map in the M union patch occupancy maps and that is in the global occupancy map, 1≤n≤N, and n is an integer.

14. The encoding apparatus according to claim 13, wherein the processor is configured to:
determine, based on the location of the $m^{th}$ union patch occupancy map in the global occupancy map, the location that is of the occupancy map of the $m^{th}$ global matched patch in the $n^{th}$ frame of point cloud and that is in the occupancy map of the $n^{th}$ frame of point cloud; and pack occupancy maps of a global matched patch and a non-global matched patch in the $n^{th}$ frame of point cloud based on locations that are of occupancy maps of at least a portion of global matched patches in the $n^{th}$ frame of point cloud and that are in the occupancy map of the $n^{th}$ frame of point cloud, to obtain the occupancy map of the $n^{th}$ frame of point cloud, wherein the at least a portion of the global matched patches comprise the $m^{th}$ global matched patch.

15. The encoding apparatus according to claim 14, wherein the processor is configured to:
map the occupancy maps of the portion of or all the global matched patches onto an initial occupancy map of the $n^{th}$ frame of point cloud based on the locations that are of the occupancy maps of the portion of or all the global matched patches and that are in the occupancy map of the $n^{th}$ frame of point cloud; and
pack occupancy maps of other patches different from the at least a portion of the global matched patches in the $n^{th}$ frame of point cloud based on the initial occupancy map that is of the $n^{th}$ frame of point cloud and onto which the occupancy maps of the at least a portion of the patches are mapped, to obtain the occupancy map of the $n^{th}$ frame of point cloud.

16. The encoding apparatus according to claim 14, wherein the occupancy map of the non-global matched patch in the $n^{th}$ frame of point cloud occupies a preset location range, or does not occupy a preset location range, wherein the preset location range belongs to a union patch occupancy map corresponding to a set comprising the global matched patch in the $n^{th}$ frame of point cloud, but does not belong to the occupancy map of the global matched patch in the $n^{th}$ frame of point cloud.

17. The encoding apparatus according to claim 12, wherein the processor is configured to:
when a difference between a maximum size of a pre-occupancy map of a first portion of point clouds in the N frames of point clouds and a size of the global occupancy map falls within a preset range, pack the occupancy maps of the global matched patch and the non-global matched patch in each of the N frames of point clouds by using the global occupancy map.

18. The encoding apparatus according to claim 12, wherein the processor is configured to:
when a difference between a maximum size of a pre-occupancy map of a first portion of point clouds in the N frames of point clouds and a maximum size of a pre-occupancy map of a second portion of point clouds in the N frames of point clouds falls within a preset range, pack the occupancy maps of the global matched patch and the non-global matched patch in each of the N frames of point clouds by using the global occupancy map.

19. The encoding apparatus according to claim 12, wherein the point cloud group is a group of frames (GOF); or the point cloud group is a sub-GOF, and the sub-GOF comprises a plurality of frames of point clouds that are temporally consecutive in one GOF; and the processor is configured to:
obtain a reference point cloud that is any frame of point cloud in the GOF; and
for an $i^{th}$ patch in the reference point cloud, if a patch that matches a target patch exists in each non-reference point cloud in the GOF, determine that the $i^{th}$ patch and the patch that matches the target patch are global matched patches, wherein the target patch is the $i^{th}$ patch or the target patch is a matched patch of the $i^{th}$ patch, and the $i^{th}$ patch is any patch in the reference point cloud.

20. A non-transitory computer-readable medium storing computer instructions, which when executed by one or more processors, cause the one or more processors to perform the operations of:
obtaining global matched patches of N frames of point clouds of a point cloud group, wherein N≥2 and N is an integer;
determining M union patch occupancy maps corresponding to M sets, wherein each of the M sets comprises N global matched patches having a matching relationship in the N frames of point clouds, wherein a union patch occupancy map corresponding to an $m^{th}$ set in the M sets is a union set of occupancy maps of all global matched patches in the $m^{th}$ set, 1≤m≤M, and both m and M are integers;
packing the M union patch occupancy maps to obtain a global occupancy map used to determine locations of the M union patch occupancy maps in the global occupancy map;
packing occupancy maps of a global matched patch and a non-global matched patch in each of the N frames of point clouds by using the global occupancy map, to obtain occupancy maps of the N frames of point clouds; and
encoding the N frames of point clouds based on the occupancy maps of the N frames of point clouds.

* * * * *